United States Patent
Popov et al.

(10) Patent No.: US 8,212,444 B2
(45) Date of Patent: Jul. 3, 2012

(54) MAGNETIC AXIAL BEARING AND A SPINDLE MOTOR HAVING THIS KIND OF MAGNETIC AXIAL BEARING

(75) Inventors: Vladimir V. Popov, Villingen-Schwenningen (DE); Martin Bauer, Villingen-Schwenningen (DE); Guido Schmid, Triberg (DE); Stefan Schwamberger, Hermsdorf (DE)

(73) Assignee: Minebea Co., Ltd., Nagano-ken (JP)

( * ) Notice: Subject to any disclaimer, the term of this patent is extended or adjusted under 35 U.S.C. 154(b) by 445 days.

(21) Appl. No.: 12/315,299

(22) Filed: Dec. 2, 2008

(65) Prior Publication Data

US 2009/0146515 A1    Jun. 11, 2009

(30) Foreign Application Priority Data

Dec. 11, 2007 (DE) .......... 10 2007 059 466
Dec. 11, 2007 (DE) .......... 10 2007 059 467
Jul. 30, 2008  (DE) .......... 10 2008 035 509

(51) Int. Cl.
    *F16C 39/06* (2006.01)
(52) U.S. Cl. .......... 310/90.5; 310/90
(58) Field of Classification Search .......... 310/90.5, 310/90
    See application file for complete search history.

(56) References Cited

U.S. PATENT DOCUMENTS

| | | |
|---|---|---|
| 3,874,778 A | 4/1975 | Kato |
| 4,012,083 A | 3/1977 | Habermann |
| 4,443,043 A | 4/1984 | Yamaguchi |
| 5,506,459 A | 4/1996 | Ritts |
| 5,541,460 A | 7/1996 | Dunfield |
| 6,172,847 B1 | 1/2001 | Sakatani |
| 6,175,174 B1 | 1/2001 | Takahashi |
| 6,340,854 B1 | 1/2002 | Jeong |
| 6,420,810 B1 | 7/2002 | Jeong |

(Continued)

FOREIGN PATENT DOCUMENTS

DE     1291575     10/1966

(Continued)

OTHER PUBLICATIONS

Translation of JP 62085216 A, USPTO, Jan. 2012.*

*Primary Examiner* — Quyen Leung
*Assistant Examiner* — David Scheuermann
(74) *Attorney, Agent, or Firm* — Cooper & Dunham LLP

(57) ABSTRACT

The invention relates to a magnetic axial bearing for taking up axial forces that act on a rotor component that is rotatably supported about a rotational axis with respect to a stator component. The bearing comprises a first bearing part consisting of at least one permanent magnet and at least two flux guide elements associated with the permanent magnet that are disposed on opposing end faces of the permanent magnet and aligned substantially radial and perpendicular to the rotational axis, and a second bearing part consisting of at least two flux guide elements that are disposed at a mutual spacing to one another and aligned substantially radial and perpendicular to the rotational axis, each flux guide element of the second bearing part being associated with a flux guide element of the first bearing part and lying directly opposite the latter in a radial direction and separated from it by an air gap. The invention further describes a spindle motor having a magnetic axial bearing of this kind, used, for example, for driving a hard disk drive.

58 Claims, 12 Drawing Sheets

U.S. PATENT DOCUMENTS 6,563,244 B1 * 5/2003 Yamauchi et al. ........... 310/90.5
6,629,503 B2 10/2003 Post

FOREIGN PATENT DOCUMENTS

| | | |
|---|---|---|
| DE | 2518735 | 11/1975 |
| DE | 19955829 | 5/2001 |
| DE | 102006013537 | 10/2007 |
| DE | 202006020045 | 10/2007 |
| EP | 0580202 | 1/1994 |
| EP | 1101845 | 9/2000 |
| JP | 58184319 | 10/1983 |
| JP | 62085216 A * | 4/1987 |
| JP | 02113118 | 4/1990 |
| JP | 06185526 | 7/1994 |

* cited by examiner

MAGNETIC AXIAL BEARING AND A SPINDLE MOTOR HAVING THIS KIND OF MAGNETIC AXIAL BEARING

BACKGROUND OF THE INVENTION

The invention relates to a magnetic axial bearing for taking up axial forces that act on a rotor component which is rotatably supported about a rotational axis with respect to a stator component. The invention moreover relates to a spindle motor having this kind of magnetic axial bearing, as may preferably be used for driving a hard disk drive.

DESCRIPTION OF THE PRIOR ART

For the rotatable support of small-scale electric motors, such as spindle motors, as used, for example, in hard disk drives having a disk diameter of 2.5 inches, 1 inch or less, or for driving small fans, it is known to use magnetic axial bearings for taking up axial loads. For spindle motors having the type of construction applicable here, which preferably take the form of electronically commutated brushless direct current motors, the shaft is coupled to a hub that is used to receive one or more hard disks. A rotor magnet is connected to the hub and disposed coaxially to a stator.

In U.S. Pat. No. 6,172,847 B1 a hard disk drive is described, for example, in which a shaft is connected to a rotor hub that carries the hard disk and is coupled to the rotor. The shaft is led into a bearing sleeve, a hydrodynamic radial bearing and an axial thrust bearing being formed between the bearing sleeve and the shaft. The axial thrust bearing is preloaded using magnetic elements in order to reduce starting torque.

The application, theory and computation of magnetic bearings have been dealt with extensively in the relevant literature. There is no doubt that magnetic bearings are particularly useful in terms of reducing bearing friction. The main problem with passive magnetic bearings is the need for stabilizing systems for at least one degree of freedom because magnets alone are not able to keep a bearing in stable equilibrium. It is accordingly impossible to create a stable bearing using only permanent magnets. To achieve magnetic levitation it is thus necessary to have additional stabilizing systems. Numerous solutions to this problem have been suggested in the prior art.

For example, R. F. Post, "Stability Issues in Ambient-Temperature Passive Magnetic Bearing Systems", Lawrence Livermore National Laboratory, UCRL-ID-137632, 17 Feb. 2000, describes magnetic bearing systems that use special combinations of levitation and stabilizing elements. Post mentions three main components that are cumulatively necessary in order to create a bearing that satisfies Earnshaw's theorem. The first component consists of a pair of ring magnets, of which one magnetic ring is stationary and the other rotational for the purpose of generating levitation. Another element used for stabilization is referred to by Post as a "Halbach Stabilisator". This element makes use of individual permanent magnets that are disposed according to a Halbach magnetic field distribution and lie opposite associated conductors. The third element is a mechanical bearing system that comes into operation at low speeds, but at high speeds should be de-coupled as far as possible. Post moreover discusses the use of damping systems based on eddy currents. The system presented by Post appears to be relatively complex and is not suitable for use in electric machines that are intended for mass production, and in particular is not suitable for spindle motors for use in mini disk drives having a form factor of 2.5 inches, 1 inch or less.

U.S. Pat. No. 5,541,460 describes a spindle motor having passive magnetic axial bearings as well as a pivot-type bearing that may be realized as a hydraulic bearing or a ball bearing. The passive magnetic axial bearing generates a force of attraction in an axial direction, and the pivot-type bearing stabilizes the arrangement so as to produce a bearing system that is also stable in a radial direction. A similar prior art is also described in U.S. Pat. No. 5,561,335 and in U.S. Pat. No. 5,545,937.

US 2003/0042812 A1 describes a passive magnetic bearing for a horizontal shaft having levitation and stabilizing elements. The levitation element consists of a pair of stationary curved ferromagnetic segments that lies within an annular, radially-acting magnet arrangement. The magnet arrangement is disposed at the inner circumference of a hollow shaft. The force of attraction between the curved segments and the magnet arrangement acts both vertically, in order to lift the shaft, as well as horizontally, in order to centralize the shaft. The stabilizing element consists of an annular magnetic Halbach arrangement and a stationary annular circuit that is disposed within the Halbach arrangement. The Halbach arrangement is positioned at the inside circumference of the hollow shaft. A repulsive force between the Halbach arrangement and the circuit increases in inverse proportion to the radial distance between these two parts and thus acts as a restoring force in order to bring the shaft into a state of equilibrium should it be moved out of this state. The bearing is configured such that alternating currents are generated between the magnetic and ferromagnetic components, which generate corresponding current losses.

US 2003/0117031 A1 describes a magnetic bearing for a spindle motor having a magnet component that is mounted between the baseplate and the motor spindle. The magnet component comprises an inner and an outer magnet section that are disposed coaxially and repulse one another so that the spindle levitates and mechanical friction is minimized. The magnetic bearing is disposed in a stationary shaft for the purpose of supporting a rotating spindle, the tip of the spindle being supported by a counterpart of the baseplate.

US 2004/0046467 A1 describes a magnetic bearing arrangement having passive (axial) magnetic thrust bearings and having radial slide bearings or ball bearings for a rotor motor.

In summary, the prior art reveals magnetic bearings having stabilization systems that comprise: steel or diamond thrust bearings based on ball bearings; magnetic fluid bearings; eddy current elements; slide bearings as axial thrust bearings; as well as hybrid passive magnetic bearings that are combined with hydrodynamic or fluid dynamic bearings respectively or with air bearings.

SUMMARY OF THE INVENTION

The invention has the object of providing a magnetic axial bearing that is capable of absorbing solely by itself all the axial forces that occur in an electric machine, and that also operates with minimum friction both at start-up as well as in stable operation of the machine, and which is particularly suitable for application in spindle motors for mini disk drives.

Another object of the invention is to provide a spindle motor having a magnetic axial bearing according to the invention that operates with minimum friction both at start-up as well as in stable operation, and which is particularly suitable for application in hard disk drives having low power consumption.

According to the invention, we now describe a magnetic axial bearing for taking up axial forces that act on a rotor component which is rotatably supported about a rotational axis with respect to a stator component, the bearing comprising a first bearing part that consists of at least one axially magnetized permanent magnet and at least two flux guide elements associated with the permanent magnet. The flux guide elements are disposed on opposing end faces of the permanent magnet and are aligned substantially radial and perpendicular to the rotational axis. The axial bearing comprises a second bearing part, consisting of at least two flux guide elements that are disposed at a mutual axial spacing to one another and aligned substantially radial and perpendicular to the rotational axis. Each flux guide element of the second bearing part is associated with a flux guide element of the first bearing part and lies directly opposite the latter in a radial direction, separated from it by an air gap.

The axial bearing according to the invention can fully replace a conventional axial bearing of a standard design, such as an axial fluid dynamic thrust bearing, a pivot-type bearing or a ball bearing. Compared to other axial bearings of a standard design, a magnetic bearing does not generate any friction. This makes the bearing system very suitable for use in an electric machine, such as a spindle motor, where reduced friction in the overall bearing also leads to a reduction in the power consumption of the electric machine.

For application in an electric machine, one of the bearing parts is connected to the stator component and the other bearing part is connected to the rotor component.

In a first embodiment of the magnetic axial bearing, the permanent magnet of the first bearing part is annular in form, and has first and second end faces as well as inner and outer circumferential surfaces. The permanent magnet is moreover axially magnetized in the direction of the rotational axis and disposed concentric to the rotational axis. The permanent magnet is preferably unipolarly magnetized in an axial direction, so as to avoid eddy currents, or multipolarly magnetized in an axial direction. One of the annular flux guide elements is disposed on the first end face and the other annular flux guide element is disposed on the second end face of the permanent magnet. The at least two flux guide elements have inner and outer circumferential surfaces. The inner and outer circumferential surfaces of the flux guide elements may preferably protrude beyond the inner or outer circumferential surface of the permanent magnet.

In the first embodiment of the invention, the second bearing part is annular in shape and lies opposite the permanent magnet of the first bearing part in a radial direction. The second bearing part may be made identical in design to the first bearing part, i.e. comprise an annular permanent magnet axially magnetized in the direction of the rotational axis on whose end faces flux guide elements are disposed. The flux guide elements of the second bearing part may protrude beyond the radially inner or radially outer circumferential surface of the permanent magnet and lie radially directly opposite the respective flux guide elements of the first bearing part. Owing to their design, the opposing flux guide plates of the first and second bearing parts form flux concentrators which concentrate and focus the magnetic flux that is generated by the permanent magnet. This goes to increase the axial force to be taken up by the axial bearing.

According to another preferred embodiment of the invention, the second bearing part may be made of a ferromagnetic material and disposed concentric to the rotational axis. Here, it is preferable if the flux guide elements form an integral part of the second bearing part. The second bearing part preferably has its largest outside diameter in the region of the flux guide elements or its smallest inside diameter respectively.

Should the flux guide elements of the second bearing part be formed as individual elements, they may preferably be made of a ferromagnetic material. Each flux guide element preferably consists of an annular sheet metal part, where this sheet metal part may also be made up of a stack of thin laminations that are stacked one on top of the other in an axial direction, i.e. in the direction of the rotational axis. The lamination stack of the flux guide elements is preferably made up of laminated sheet metal. By using a permanent magnet magnetized unipolarly in the axial direction or a stack of laminations as a flux guide element, eddy currents can be avoided to the greatest possible extent, so that no significant eddy current losses at all occur. The thickness of the flux guide elements is preferably substantially less than the thickness of the permanent magnet. According to the invention, the first and/or the second bearing part may also comprise two or more annular permanent magnets that are oppositely magnetized in an axial direction. Flux guide elements of the type described above are disposed between the several permanent magnets and on the end faces of the respective outer permanent magnets.

Preferably the protruding flux guide elements of one or both bearing parts narrow in cross section where they lie opposite of the respective flux guide element on the other bearing part. The gap between the respective flux guide elements of first and the second bearing part is very small, preferably between 20 and 200 μm. The narrowing shape of the flux guide elements and the small gap additionally help to focus the magnetic flux that is generated by the permanent magnet and therefore to achieve an additional increase in the axial force to be taken up by the axial bearing.

Within the spirit of the invention, it is of no great importance whether the first bearing part is disposed on the stator component and the second bearing part on the rotor component of an electric machine, or should the opposite situation be preferred where the first bearing part is disposed on the rotor component and the second bearing part on the stator component of the electric machine.

Radial loads occurring between the rotor component and the stator component can be taken up by radial bearings of a known design, such as fluid dynamic radial bearings, roller bearings etc.

A further aspect of the invention relates to a spindle motor that has a stationary motor component, the stator, and a rotatable motor component, the rotor, as well as a fluid dynamic radial bearing for the rotatable support of the rotor about a rotational axis with respect to the stator, a bearing gap being formed between parts of the rotor and parts of the stator and this bearing gap being filled with a bearing fluid. Moreover, the spindle motor comprises a magnetic axial bearing, having a first bearing part, consisting of at least one permanent magnet and at least two flux guide elements associated with the permanent magnet that are disposed on opposing end faces of the permanent magnet and aligned substantially radial and perpendicular to the rotational axis. The axial bearing comprises a second bearing part having a flux concentrator that has at least two flux guide elements which are disposed at a mutual spacing to one another and aligned substantially radial and perpendicular to the rotational axis, each flux guide element of the second bearing part being associated with a flux guide element of the first bearing part and lying directly opposite the latter in a radial direction and separated from it by an air gap. An electromagnetic drive system is provided for driving the spindle motor, the electromagnetic drive system having a stator arrangement disposed on the stationary motor component and a rotor magnet disposed on the rotatable motor component.

Compared to conventional spindle motors of a standard design that are fitted with fluid dynamic axial bearings, axial ball bearings or pivot-type bearings, the spindle motor according to the invention having a magnetic axial bearing has the advantage that, due to the magnetic axial bearing, the overall bearing friction is reduced vis-à-vis the above-mentioned arrangements according to the prior art. Thanks to the reduction in friction, the spindle motor requires less driving power and thus has up to 30% less power consumption than spindle motors of a known design. This kind of spindle motor is thus very suitable for use in hard disk drives having low power input or other power saving drives.

The stationary motor component of the spindle motor comprises a bearing bush fixed in a baseplate, the first bearing part being preferably disposed at an outside circumference of the bearing bush. The rotatable motor component comprises a shaft rotatably supported in the bearing bush and a hub connected to the shaft, the second bearing part of the axial bearing being disposed at an inside circumference of the hub or a component connected to the hub and enclosing the first bearing part.

The two bearing parts of the magnetic axial bearing may of course be interchanged so that the first bearing part of the axial bearing is disposed at the inside circumference of the hub and the second bearing part of the axial bearing is disposed at the outside circumference of the bearing bush.

In a first embodiment of the spindle motor, the permanent magnet of the first bearing part of the axial bearing is annular in shape and has first and second end faces as well as inner and outer circumferential surfaces. The permanent magnet is preferably magnetized unipolarly in an axial direction, in the direction of the rotational axis, and disposed concentric to the rotational axis. An annular flux guide element is disposed on the first end face of the permanent magnet and the other annular flux guide element is disposed on its second end face. The flux guide elements have radially inner and radially outer circumferential surfaces. The radially inner and radially outer circumferential surfaces of the flux guide elements may preferably protrude beyond the radially inner or radially outer circumferential surface of the permanent magnet.

The flux guide elements may either form an integral part of the bearing bush or they may also be manufactured as a separate component. At all events, the flux guide elements have to be made of a ferromagnetic material, taking the form, for example, of sheet metal rings. In a preferred embodiment, the second bearing part of the axial bearing is annular in shape and lies opposite the first bearing part in a radial direction. The second bearing part may be made identical to the first bearing part, i.e. comprise an annular permanent magnet magnetized in the direction of the rotational axis on whose end faces flux guide elements are disposed. The flux guide elements of the second bearing part may protrude beyond the radially inner or radially outer circumferential surface of the permanent magnet of the second bearing part and lie radially directly opposite the respective flux guide elements of the first bearing part. Owing to their design, the opposing flux guide elements of the first and second bearing parts form flux concentrators that concentrate and focus the magnetic flux generated by the permanent magnet(s). This goes to increase the axial force to be taken up by the axial bearing.

According to another preferred embodiment of the invention, the second bearing part of the axial bearing may be made of a ferromagnetic material and disposed concentric to the rotational axis. Here, it is preferable if the flux guide elements form an integral part of the second bearing part. The second bearing part preferably has its largest outside or smallest inside diameter in the region of the flux guide elements.

Should the flux guide elements of the bearing parts be formed as individual elements, they are preferably made of a ferromagnetic material. Each flux guide element preferably consists of an annular sheet metal part, wherein this sheet metal part may either be made of solid material or made up of a stack of thin laminations that are stacked one on top of the other in an axial direction, i.e. in the direction of the rotational axis. The lamination stack of each flux guide element is thus preferably made up of laminated sheet metal. By using a stack of laminations as a flux guide element and having a permanent magnet magnetized unipolarly in an axial direction, eddy currents can be avoided so that no eddy current losses at all occur. The thickness of the flux guide elements is preferably substantially less than the thickness of the permanent magnet. According to the invention, the first and/or the second bearing part of the axial bearing may also comprise two or more annular permanent magnets that lie one on top of the other in an axial direction and are oppositely magnetized. Flux guide elements of the kind described above are disposed between the several permanent magnets and on the end faces of the respective outer permanent magnets.

The cross-section of the protruding flux guide elements of one or both bearing parts may narrow Within the spirit of the invention, it is of no great importance whether the first bearing part of the axial bearing is disposed on the stationary motor component and the second bearing part of the axial bearing on the rotatable motor component, or should the opposite situation be preferred where the first bearing part is disposed on the rotatable motor component and the second bearing part on the stationary motor component of the spindle motor.

Radial loads occurring between the rotor component and the stator component can be taken up by radial bearings of a known design, such as fluid dynamic radial bearings, roller bearings etc. The two radial bearings, which are preferably designed as fluid dynamic bearings, are formed by the opposing bearing surfaces of the shaft and the bearing bush, the bearing surfaces being separated from each other by a bearing gap.

According to the invention, the bearing system of the spindle motor is closed at one end, a sealing gap adjoining the open end of the bearing gap which, seen in the course from the bearing gap to the bearing opening, is preferably disposed between a radially outwards directed sleeve surface of the bearing bush and an opposing radially inwards directed sleeve surface of the hub, slightly inclined with respect to the rotational axis, so that a tapered capillary sealing gap remains between the inner wall of the hub and the opposing outer wall of the bearing bush, the sealing gap being at least partially filled with bearing fluid. The sealing gap can be connected to the bearing gap via a largely radially extending ring gap and run substantially parallel to the bearing gap. However, the sealing gap may also run substantially transversely to the bearing gap, where it is disposed between an end face of the bearing bush and an opposing annular surface of the hub, and partly filled with bearing fluid. This sealing gap forms a capillary seal, preferably a tapered capillary seal that, starting from the bearing gap, preferably opens up at an angle of 0° to 15°.

The hub of the spindle motor may be formed as a single piece or as several pieces. For example, the hub may consist of a first hub part connected to the shaft and a second hub part connected to the first hub part. In the latter case, the second bearing part is formed as part of the second hub part or forms the second hub part in its entirety. It is of course possible for the second bearing part to also be formed as a third component separate from the second hub part. It is additionally also possible to form the shaft and the first hub part integrally as one piece. In this case, the stopper ring connected to the shaft is designed as a separate component for the sake of ease of assembly.

To prevent the rotatable motor component from moving too far in an axial direction compared to the stationary motor component, a stopper ring is preferably disposed at one end of the shaft, the stopper ring lying axially opposite a step disposed in the bore of the bearing bush and hitting against the step if the shaft makes an excessively large axial movement.

Alternatively, a stopper ring may be disposed on the second bearing part of the axial bearing, the stopper ring lying axially opposite a step disposed at the outside circumference of the bearing bush. Since the second bearing part forms part of the hub and the hub is connected to the shaft, excessive axial play of the rotatable bearing part can also be prevented in this way.

The invention is described in more detail below on the basis of several preferred embodiments of magnetic axial bearings and spindle motors having these kinds of axial bearings with reference to the drawings.

DESCRIPTION OF PREFERRED EMBODIMENTS OF THE INVENTION

Figure 1:
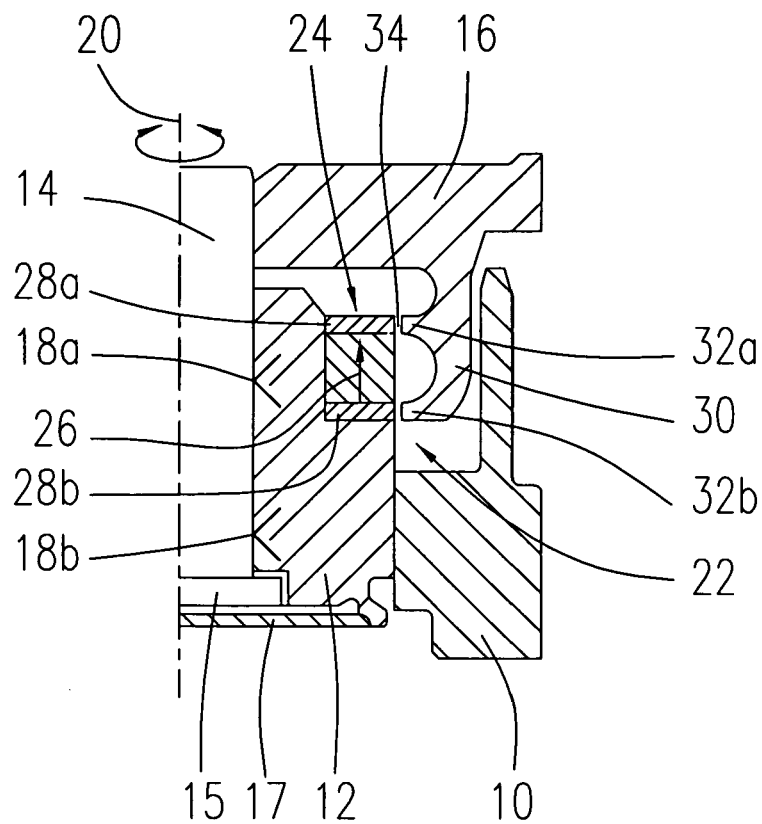
FIG. 1 schematically shows a section through a bearing system having a magnetic axial bearing in a first embodiment of the invention.

FIG. 1 schematically shows a section through a bearing system having a magnetic axial bearing according to the invention. The illustrated bearing system may be used, for example, for the rotatable support of an electric motor. The bearing system comprises a stator component 10, such as a baseplate, in which a bearing bush 12 is held. The bearing bush 12 receives a rotatable shaft 14 that is connected to a rotor component 16, the hub. The shaft 14 is rotatably supported about a rotational axis 20 in a bore of the bearing bush 12 by means of two radial bearings 18a and 18b. In the illustrated embodiment, the radial bearings 18a and 18b are designed as fluid dynamic radial bearings, as is basically known from the prior art. The axial loads that act on the shaft 14 are absorbed by a magnetic axial bearing 22 as designed according to the invention, which is made up of a first bearing part 24 and a second bearing part 30. In the illustrated embodiment, the first bearing part 24 is located radially inwards of the second bearing part 30 and is disposed on a step at the outside circumference of the bearing bush 12. The first bearing part 24 comprises an annular permanent magnet 26 disposed concentric to the rotational axis 20. Two annular flux guide elements 28a and 28b are disposed on the end faces of the permanent magnet 26, the annular flux guide elements 28a and 28b preferably being made of a ferromagnetic material. The permanent magnet 26 is preferably magnetized unipolarly in an axial direction.

In this embodiment, the second bearing part 30 consists of an annular extension piece integrally connected to the rotor 16 which forms two flux guide elements 32a and 32b that are disposed opposite the flux guide elements 28a and 28b of the first bearing part 24 in a radial direction. The magnetic flux lines emanating from the permanent magnet 26 of the first bearing part 24 are concentrated in the flux guide elements 28a and 28b and led via an air gap 34 and the flux guide elements 32a and 32b of the second bearing part 30 back to the permanent magnet 26. The semi-toroidal space between the flux guide elements 32a and 32b facing the first bearing part 24 may be filled with a diamagnetic material.

If the shaft 14 and the rotor component 16 are deflected with respect to the bearing bush 12 and the stator component 10 in an axial direction, the interaction of the permanent magnet 26 with the flux guide elements 18a and 18b and 32a and 32b on the opposite side generates a restoring force in an axial direction that keeps the rotor component in stable levitation in an axial direction with respect to the stator component. The permanent magnet 26 moreover attracts the second bearing part 30 in a radial direction which additionally goes to produce a preload of the bearing in a radial direction, thus reinforcing the effect of the radial bearings 18a and 18b. The second bearing part 30 or the rotor 16 is preferably made of a ferromagnetic material. The bearing bush 12 and the shaft 14 are preferably made of a non-magnetic or a soft magnetic material, such as non-magnetic steel.

The axial magnetic bearing arrangement according to the invention makes it possible to significantly reduce bearing friction because an axial thrust bearing of a conventional design can be entirely dispensed with and the axial bearing gap can thus be made correspondingly large. The magnetic bearing also acts accordingly when the bearing system is at a standstill, unlike, for example, a fluid dynamic axial bearing.

Figure 11:
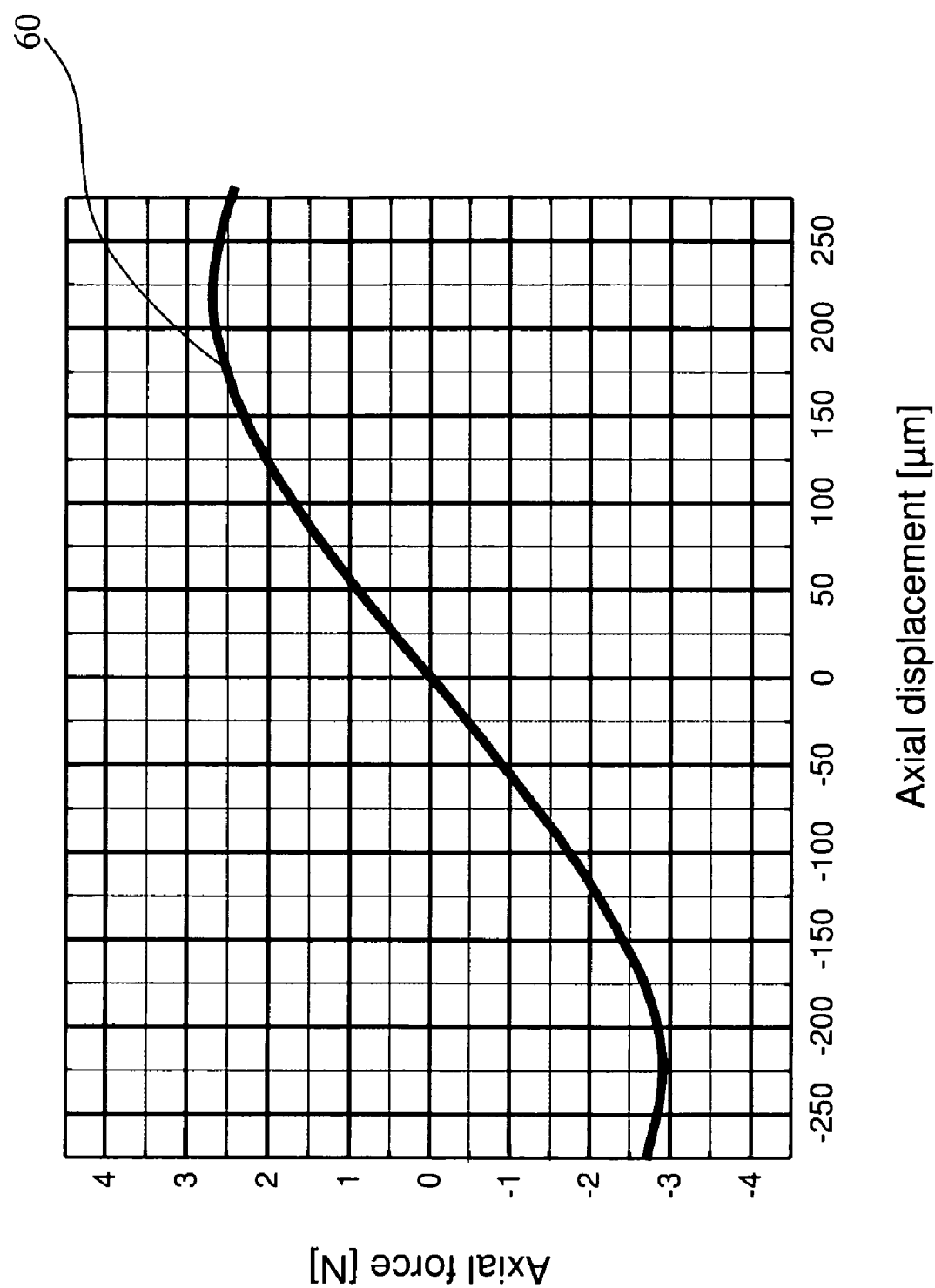
FIG. 11 shows a characteristic of the axial force generated by the magnetic axial bearing.

FIG. 11 shows the characteristic 60 of the axial restoring force of the magnetic bearing as a function of its deflection in an axial direction vis-à-vis a stable situation. In the example, the diameter of the axial magnetic bearing ranges from only a few millimeters up to a few centimeters, whereby the axial play of the bearing may be, for example, +−100 μm. As shown in FIG. 11, restoring forces in the region of several Newton can be achieved with this embodiment, where the restoring forces may vary according to the design and dimensions of the bearing and the absolute values in FIG. 11 should only be taken as an example.

As can be seen from the restoring characteristic 60, the curve shows a certain asymmetry that can be attributed to the influence of the properties and materials of the components, particularly those of the bearing bush 12 and the rotor 16.

Figure 2:
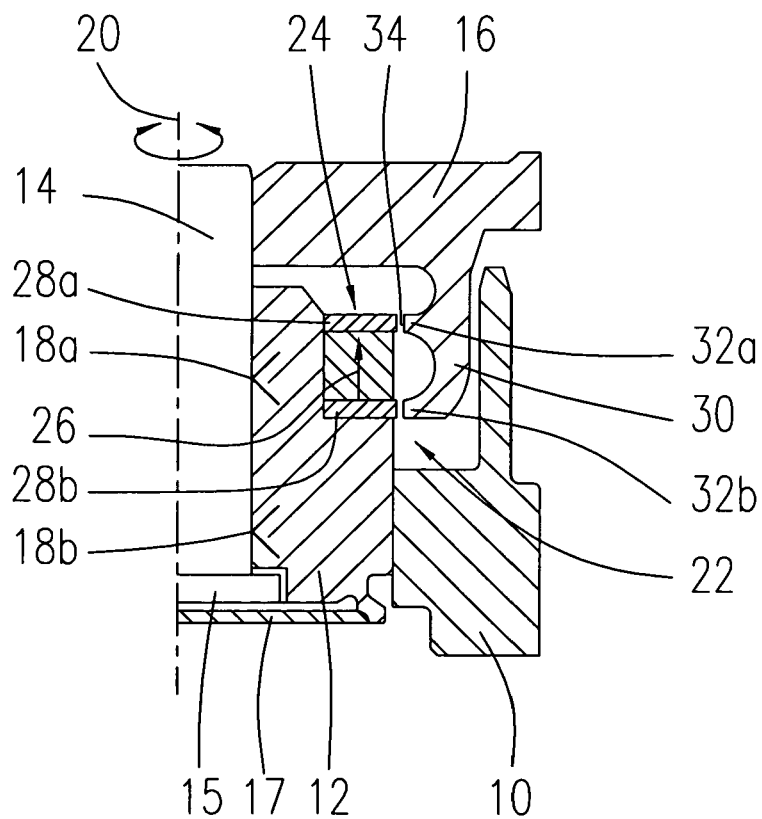
FIG. 2 shows a section through a bearing system having a magnetic axial bearing according to a second embodiment of the invention.

FIG. 2 schematically shows a section through a bearing arrangement having a magnetic axial bearing according to a further embodiment of the invention. Identical components to those in FIG. 1 are indicated by the same reference numbers. The embodiment of FIG. 2 differs from the first embodiment in the construction of the first bearing part 24 of the axial bearing. The first bearing part 24 again comprises a permanent magnet 26, on each of whose end faces a flux guide element 28a and 28b is disposed. In contrast to the first embodiment according to FIG. 1, the flux guide elements 28a and 28b according to FIG. 2 have a larger outside diameter than the permanent magnet 26 so that they project beyond the edge of the permanent magnet and the magnetic flux lines become more heavily concentrated in the air gap between flux guide elements 28a and 28b or flux guide elements 32a and 32b of the second bearing part 30. This measure goes to produce greater restoring forces of the axial bearing as compared to FIG. 1.

Figure 3:
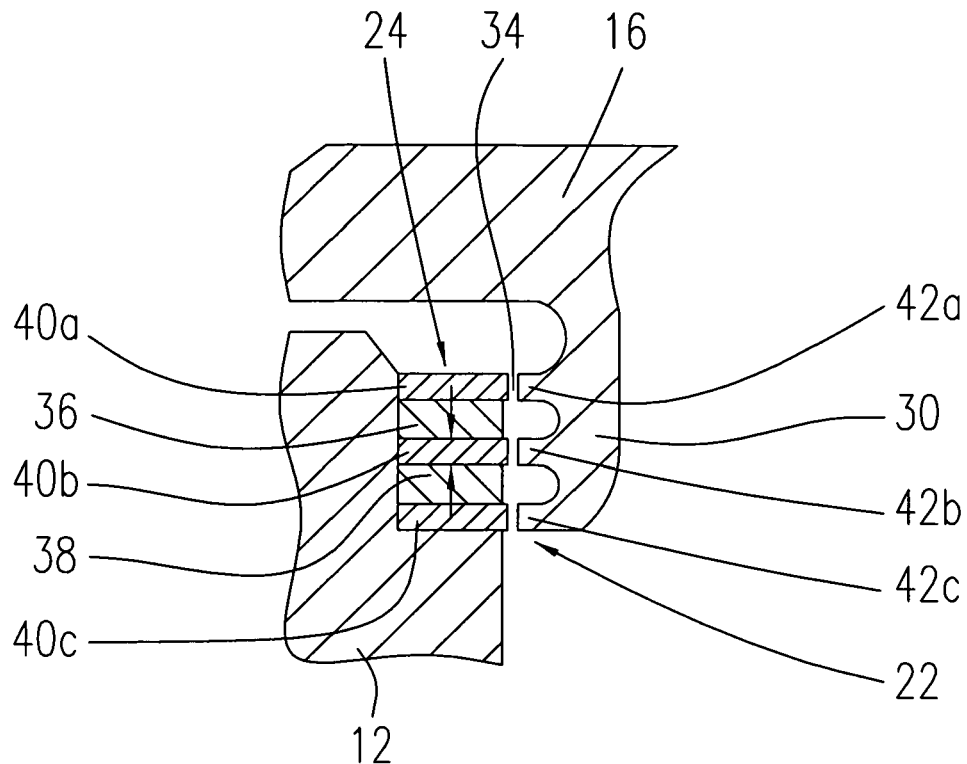
FIG. 3 shows a section through a magnetic axial bearing according to a third embodiment of the invention.

FIG. 3 shows a schematic section through a further embodiment of an axial magnetic bearing according to the invention. Identical components to those in FIG. 1 are indicated by the same reference numbers. The embodiment of FIG. 3 differs from the embodiments according to FIGS. 1 and 2 by the number of permanent magnets of the first bearing part 24 and the number of flux guide elements. The first bearing part 24 comprises two annular permanent magnets 36 and 38, a flux guide element 40a, 40b and 40c being disposed between the magnets and at each end face of the permanent magnets 36, 38. The permanent magnets 36, 38 are oppositely magnetized in an axial direction. The second bearing part 30 is disposed radially opposite the first bearing part 24 and again comprises three flux guide elements 42a, 42b and 42c, each being disposed radially opposite a flux guide element 40a, 40b and 40c of the first bearing part 24. The use of two permanent magnets 36, 38 makes it possible to achieve a greater restoring force of the axial magnetic bearing compared to the bearings of FIGS. 1 and 2, since the magnetic force is almost doubled.

Figure 4:
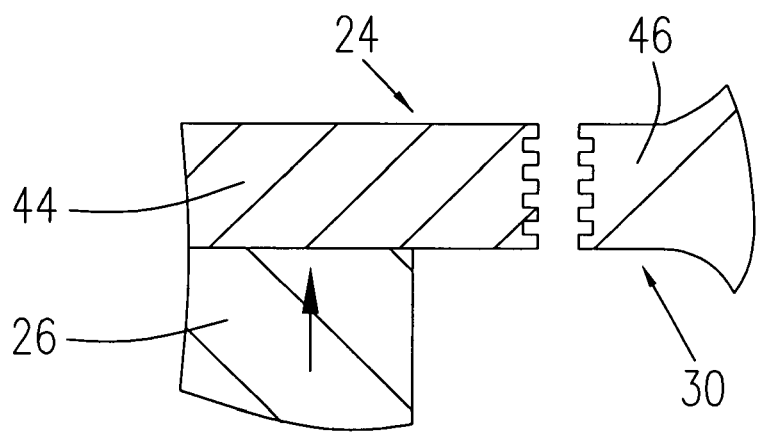
FIG. 4 shows a section through flux guide plates having a serrated circumferential surface.

FIG. 4 shows a section through a modified embodiment of the flux guide elements of the two bearing parts. A flux guide element 44 of the first bearing part 24 of the axial bearing 22 does not have a uniform outside diameter but rather has a series of notches at the outside circumference, so that the flux guide element 44 appears to be serrated in cross-section. The number of teeth depends on the thickness of the flux guide element 44 and on the method used to form the notches. The flux guide element 46 of the opposing second bearing part 30 also has indentations with the same number of teeth, each tooth of flux guide element 44 lying exactly radially opposite a tooth of flux guide element 46. The plurality of teeth makes it possible to better concentrate the magnetic flux lines of the magnet 26 and thus to use a larger proportion of the magnetic flux for the purposes of the axial bearing. To increase the concentration of the magnetic flux lines even further, the spaces between the teeth of the flux guide elements may additionally be filled with a diamagnetic material.

Figure 5:
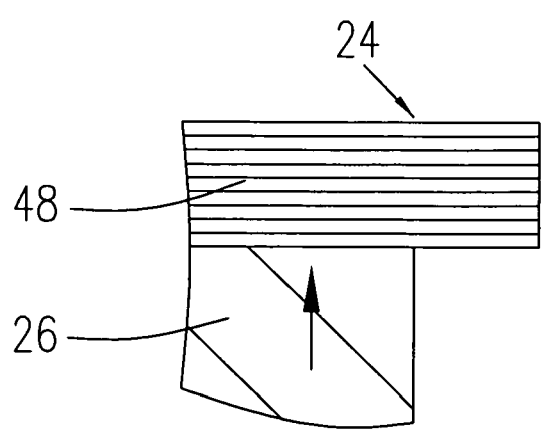
FIG. 5 schematically shows a flux guide plate made up of several stacked laminations.

FIG. 5 schematically shows a section through the first bearing part 24 of the axial bearing 22 having a flux guide element 48 that is made up of a number of laminated metal sheets. The metal sheets of the lamination stack of the flux guide element 48 are aligned in a radial direction, so that the formation of eddy currents can be prevented even if a permanent magnet 26 multipolarly magnetized in an axial direction is used.

Figure 6:
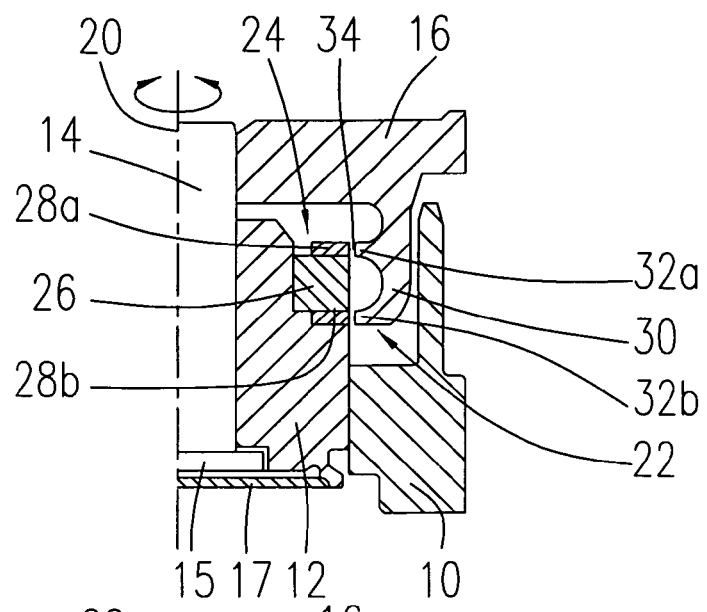
FIG. 6 schematically shows a section through a bearing having a magnetic axial bearing according to a fourth embodiment of the invention.

FIG. 6 schematically shows a section through a bearing system having a magnetic axial bearing according to a further embodiment of the invention. FIG. 6 corresponds substantially to the embodiment of FIG. 1, identical components being indicated by the same reference numbers. The embodiment of FIG. 6 differs from the embodiment according to FIG. 1 by the construction of the first bearing part 24 of the axial bearing 22. In this embodiment, the flux guide elements 28a and 28b, which are disposed on the permanent magnet 26 of the first bearing part 24, do not cover the entire end face of the annular permanent magnet, but rather the permanent magnet 26 has a smaller inside diameter than the annular flux guide elements 28a and 28b. This goes to reduce back leakage flux so that the main magnetic flux is increased. The outside diameter of the permanent magnet 26 and the flux guide elements 28a and 28b, however, remain the same.

Figure 7:
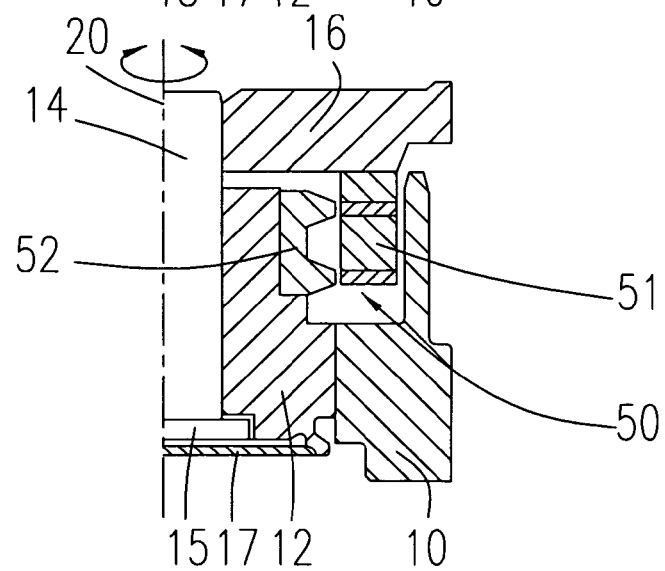
FIG. 7 shows a section through a bearing system having a magnetic axial bearing according to a fifth embodiment of the invention.

FIG. 7 shows a further embodiment of the magnetic axial bearing according to the invention, identical components as those in FIGS. 1 and 2 being given the same reference numbers. In contrast to the preceding embodiments of the invention, in FIG. 7 the positions of the first and second bearing parts 50 and 52 have been interchanged, i.e. the first bearing part 50 is disposed on the rotor 16, whereas the second bearing part 52 is disposed on the bearing bush 12. The first bearing part 50 comprises the permanent magnet 51 and flux guide elements fixed at each end face that are attached to the rotor 16 by means of a connecting piece. The second bearing part 52 is disposed radially opposite in the direction of the rotational axis 20, the second bearing part 52 being fixed to a step of the bearing bush 12. The second bearing part 52 comprises narrowing flux guide elements that lie radially opposite the flux guide elements of the first bearing part.

Figure 8:
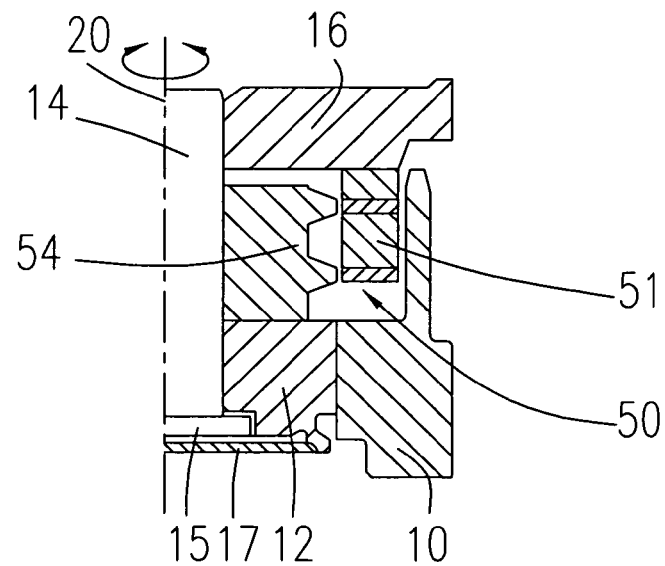
FIG. 8 shows a section through a bearing system having a magnetic axial bearing according to a sixth embodiment of the invention.

FIG. 8 shows a modified embodiment of the embodiment according to FIG. 7 that differs from FIG. 7 in that the second bearing part 54 directly adjoins the outside circumference of the shaft and, together with the bearing bush 12, provides the radial support of the shaft 14. Narrowing Flux guide elements are provided on bearing part 54 lying opposite bearing part 50.

Figure 9:
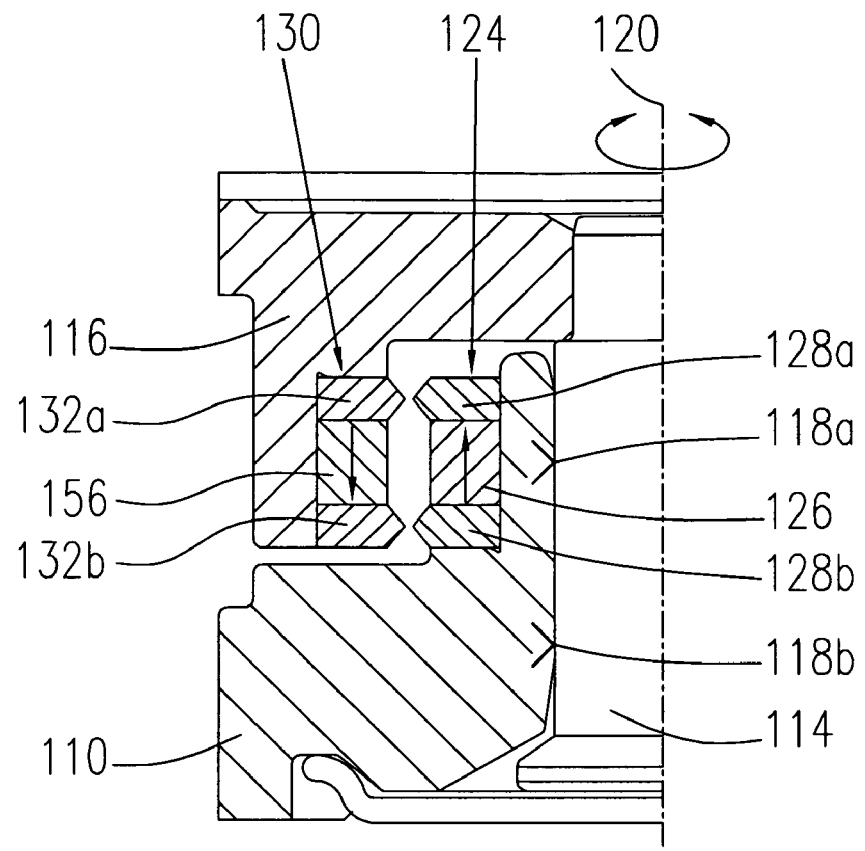
FIG. 9 shows a section through a bearing system having a magnetic axial bearing according to a seventh embodiment of the invention.

FIG. 9 shows a section through a bearing system having a magnetic axial bearing according to the invention in accordance with a further embodiment. A first bearing part 124 is fixed to a stator component 110 in which a shaft 114 is rotatably supported by means of radial bearings 118a and 118b. The first bearing part 124 comprises a permanent magnet 126, on whose end faces two flux guide elements 118a and 118b are fixed that protrude beyond the outside circumference of the permanent magnet 126. The shaft 114 is connected to a rotor 116 on whose inside circumference a second bearing part 130 is disposed radially opposite the first bearing part 124. The second bearing part 130 again comprises a permanent magnet 156 at whose end faces flux guide elements 132a and 132b are disposed. The flux guide elements 132a and 132b project beyond the inside circumference of the magnets 156 and lie directly opposite flux guide elements 128a and 128b. The flux guide elements 132a, 132b, 128a and 128b respectively narrow to a tip where thy lie opposite of each other. This embodiment is characterized by the use of a permanent magnet in each bearing part 124 and 130. For each bearing part, however, two or more permanent magnets may also be used.

Figure 10:
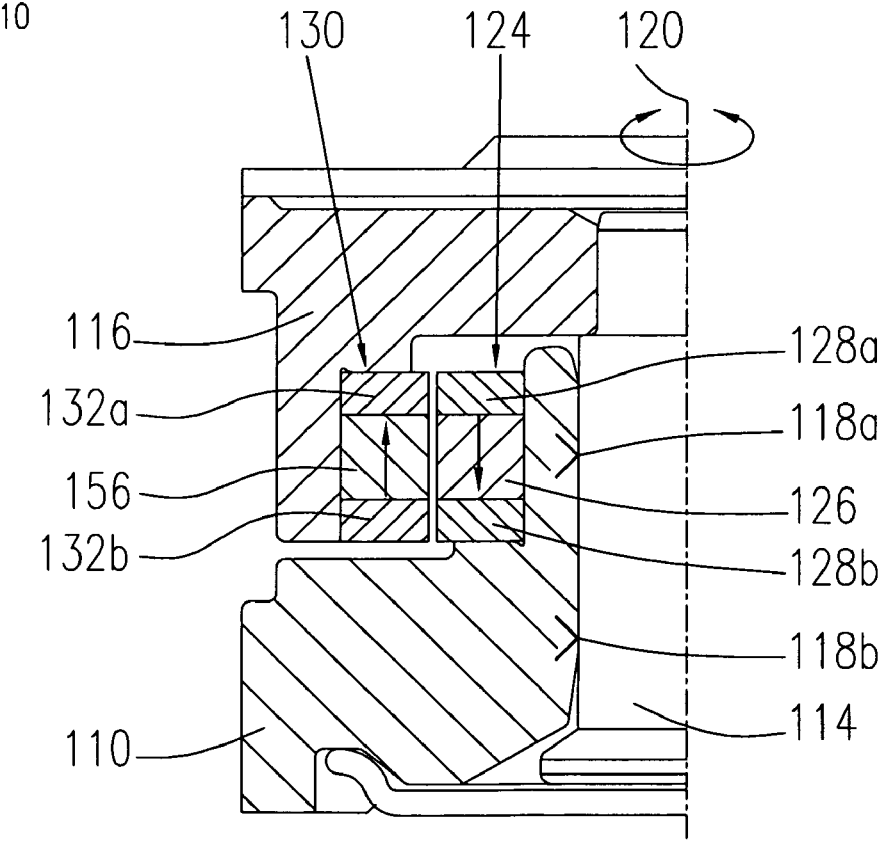
FIG. 10 shows a section through a bearing system having a magnetic axial bearing according to an eighth embodiment of the invention.

FIG. 10 shows a section through a bearing system having an axial bearing according to the invention, identical components as those in FIG. 9 being given the same reference numbers. In contrast to FIG. 9, the inside and outside diameters of the flux guide elements 128a and 128b extend on the same plane as the inside and outside diameters of the permanent magnet 126. Equally, the inside and outside diameters of flux guide elements 132a and 132b extend on the same plane as the inside and outside diameters of permanent magnet 156.

The bearing systems having a magnetic axial bearing presented here are particularly suitable for the rotatable support of spindle motors for hard disk drives with storage disks having a diameter of 3.5 inches, 2.5 inches and less. In this kind of spindle motor, the shaft has, for example, a diameter of 2-3 millimeters and the outside circumference of the hub a diameter of 10-20 millimeters. The thickness of the permanent magnets is then, for example, 1 mm and that of the flux guide elements 0.2 mm. These dimensions, however, are only given by way of example and the invention is not limited to them.

Figure 12:
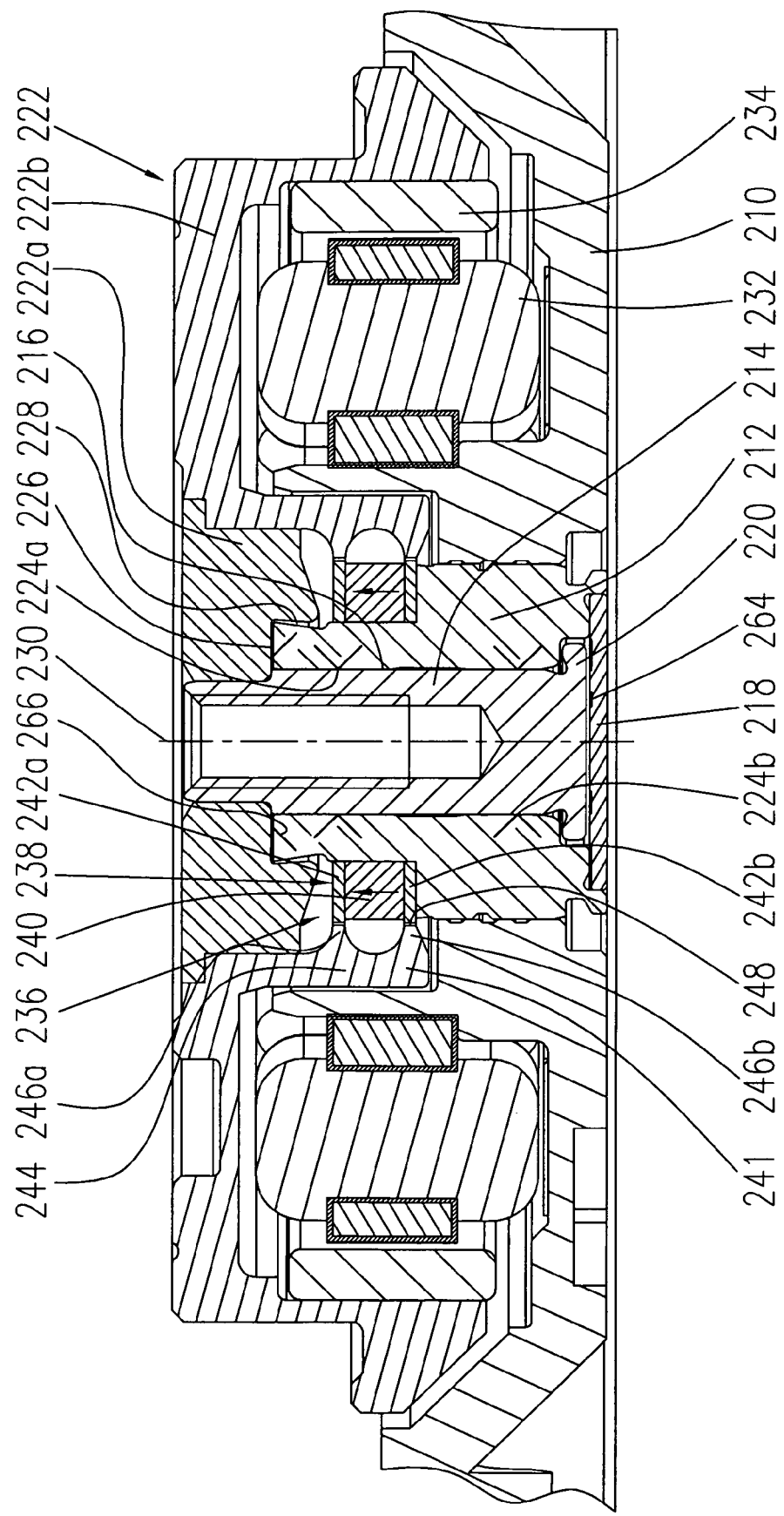
FIG. 12 shows a section through a first embodiment of a spindle motor according to the invention having a magnetic axial bearing.

FIG. 12 shows a section through a spindle motor designed according to the invention having a magnetic axial bearing. The spindle motor comprises a baseplate 210 that has an opening in which a bearing bush 212 is fixed. The bearing bush 212 has a central bearing bore in which a shaft 214 is rotatably supported. A bearing gap 216 filled with a bearing fluid remains between the outside circumference of the shaft 214 and the inside circumference of the bore in the bearing bush 212. To prevent bearing fluid from leaking out of the bearing gap 216, the bearing gap is closed at one end by a cover plate 218 that is disposed and fixed in a recess in the bearing bush 212. Spiral-shaped, inward-pumping grooves for expelling any air that may collect under the shaft may be disposed on the cover plate 218 or on the opposing end of the shaft 214. The other end of the bearing gap 216 is connected via an annular connecting gap 226 to a sealing gap 228 which forms a tapered capillary seal that is disposed between an outer sleeve surface of the bearing bush 212 and an opposing inner sleeve surface of a hub 222. In the region of the connecting gap 226, additional pumping patterns 266 taking the form of grooves may be provided on the surfaces of the bearing bush or hub to compensate the centrifugal forces acting on the bearing fluid. These pumping patterns 266 form a kind of pumping seal to reinforce the capillary seal formed by the sealing gap 228. The pumping patterns generate a pumping effect directed inwards in the direction of the rotational axis 230. Due to the small outside diameter of the sleeve surface of the bearing bush, less bearing friction occurs within the connecting gap 226 and also within the capillary seal, so that all in all the motor consumes considerably less power.

The hub 222 is connected to the free end of the shaft 214. The shaft 214 is supported in the bearing bush 212 by two radial bearings 224a and 224b, which preferably take the form of fluid dynamic radial bearings having herringbone radial bearing patterns. The upper radial bearing 224a is preferably made asymmetric, the branch of the radial bearing patterns adjacent to the upper bearing opening being longer than the lower branch, thus bringing about an increase in pressure in the interior of the bearing which prevents dissolved air within the bearing fluid from outgassing. In principle, multi-face slide bearings or grooveless slide bearings may also be used as radial bearings. To prevent any excessive axial movement of the shaft 214 in the bearing bush 212, the shaft 214 has a stopper ring 220 at one end that is disposed in a recess of the bearing bush 212. The stopper ring 220 lies opposite a step formed by the bearing bush and strikes against this step as soon as the shaft 214 makes an excessive axial movement. The cover plate 218 may have grooved patterns on its surface facing the end face of the shaft 214, which, on rotation of the shaft 214 in the bearing bush 212, generate a pumping effect on the bearing fluid, thus resulting in an increase in pressure in this region of the bearing, so that negative pressure is prevented at the closed end of the bearing. The electromagnetic drive system of the spindle motor is formed by a stator arrangement 232 fixed to the baseplate 210, a rotor magnet 234 disposed radially outwards on the hub 222 lying opposite the stator arrangement 232.

The axial loads that act on the shaft 214 are absorbed by a magnetic axial bearing 236, which is made up of a first bearing part 238 and a second bearing part 244. In FIG. 12, the first bearing part 238 is disposed radially inwards of the second bearing part 244 on a step at the outside circumference of the bearing bush 212. The first bearing part 238 comprises an annular permanent magnet 240 disposed concentric to the rotational axis 230 that contains, for example, NdFeBr. Two annular flux guide elements 242a, 242b are disposed on the end faces of the permanent magnet 240, the annular flux guide elements 242a, 242b being preferably made of a ferromagnetic plate having a thickness, for example, of 0.2 mm or from a stack of laminations. The permanent magnet 240 is magnetized unipolarly or multipolarly in an axial direction, i.e. in the direction of the rotational axis 230. To prevent the bearing bush as far as possible from short circuiting the magnetic flux, it is preferably made, and perhaps the shaft 214 as well, of a non-magnetic material or of soft magnetic steel.

In this embodiment, the second bearing part 244 comprises an annular extension piece formed on an outer part 222b of the hub 222, the extension piece having a flux concentrator 241 that forms two defined, preferably integral flux guide elements 246a, 246b that are disposed opposite the flux guide elements 242a and 242b of the first bearing part 238 in a radial direction. The flux guide elements 242a and 242b preferably have a slightly larger outside diameter than the permanent magnet 240. The flux guide elements 246a and 246b of the flux concentrators 241 similarly form annular zones and define the smallest inside diameter of the second bearing part 244. The opposing flux guide elements of the first and second bearing part are separated from each other by an air gap 248. The magnetic flux lines emanating from the permanent magnet 240 of the first bearing part 238 are concentrated in the flux guide elements 242a and 242b and led in a radial direction via the air gap 248 and the flux guide elements 246a and 246b of the second bearing part 244 back to the permanent magnet 240. As soon as the shaft 214 and the hub 222 are deflected in an axial direction with respect to the bearing bush 212 and the baseplate 210, the interaction of the permanent magnet 240 with flux guide elements 242a, 242b and flux guide elements 246a and 246b of the opposing bearing part generates a restoring force in an axial direction, which keeps the rotatable motor component in stable levitation in an axial direction with respect to the stationary motor component. The permanent magnet 240 likewise attracts the second bearing part 244 in a radial direction, so that apart from axial stabilization, a radial preload of the fluid bearing is produced that goes to reinforce the effect of the radial bearings 224a and 224b.

The hub 222 preferably consists of two hub parts 222a and 222b, where for hub part 222a a non-magnetic or soft magnetic material, such as aluminum or soft magnetic steel, is preferably used. For the second hub part 222b, on which the second bearing part 244 is molded, a ferromagnetic material, such as steel, is preferably used. In the case of a two-piece hub, the first hub part 222a is initially mounted, then the bearing is filled with bearing fluid and the second hub part 222b is subsequently mounted.

In the spindle motor according to the invention having a magnetic axial bearing, friction losses in the bearing system are considerably reduced because an axial thrust bearing of a conventional design can be entirely dispensed with and in its place, a magnetic axial bearing is used that operates friction-free. Moreover, since no axial fluid dynamic bearings are used, the axial sections of the fluid gap may be made correspondingly large, which also goes to reduce friction losses here. This means that the axial bearing gaps of approximately 10 micrometers to date can be made at least double or three-times as large, that is 20-30 micrometers. The magnetic bearing also operates accordingly when the bearing system is at a standstill, in contrast, for example, to a fluid dynamic axial bearing, where appropriate axial lifting (fly height) of the axial bearing only takes place on operation, i.e. on rotation, of the bearing, as a result of the formation of a pressure cushion acting axially.

A recirculation channel (not illustrated) may also be provided in the bearing bush 212 as an option, the recirculation channel being formed as an axial bore in the bearing bush 212. Beyond the bearing gaps, this recirculation channel connects, for example, the lower region of the bearing, i.e. the section of the bearing gap in the region of the stopper ring 220, to the connecting gap 226 and ensures a uniform circulation of bearing fluid in the bearing as well as pressure equalization—particularly at the end of the shaft—within the fluid bearing when there are deviations from cylindricity in the bearing bore in the region of the fluid dynamic radial bearings.

Figure 13:
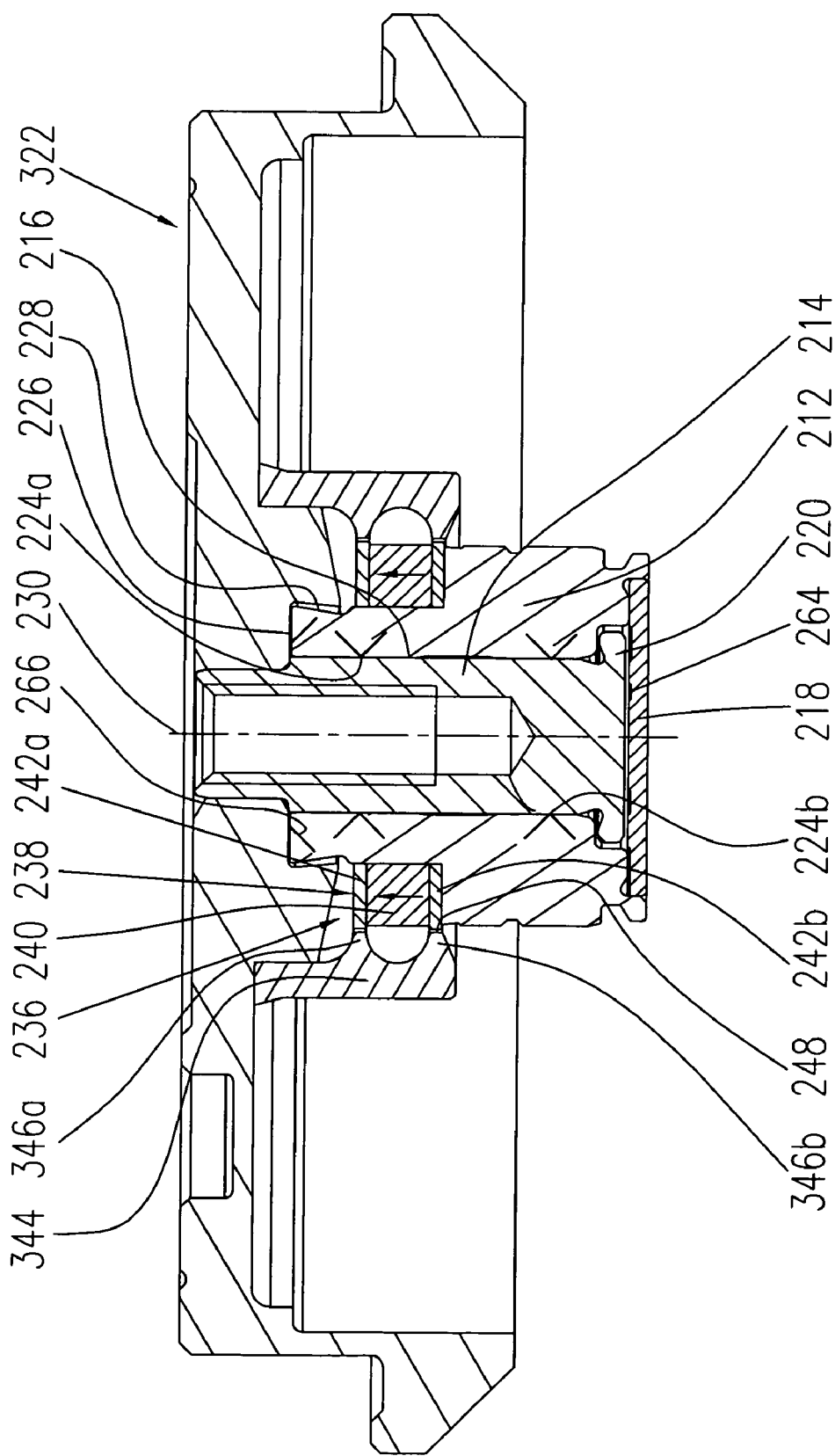
FIG. 13 shows a section through a second embodiment of a spindle motor according to the invention having a magnetic axial bearing, the baseplate and drive components not being illustrated.

FIG. 13 shows a part of the spindle motor according to FIG. 12, the baseplate and the electromagnetic drive system not being illustrated. In FIG. 13, identical components are indicated by the same reference numbers as in FIG. 12. The description of the components and the functioning of the spindle motor according to FIG. 13 correspond to the spindle motor in FIG. 12. In contrast to FIG. 12, the hub 322 of the spindle motor of FIG. 13 is integrally formed as one piece and is preferably made of a soft magnetic or non-magnetic material, such as aluminum or soft magnetic steel. The second bearing part 344 is formed as an annular part and attached to an extension piece of the hub 322, pressed or bonded onto it, for example. The second bearing part 344 is made of a ferromagnetic material and forms two radially inwards directed flux guide elements 346a, 346b.

Figure 14:
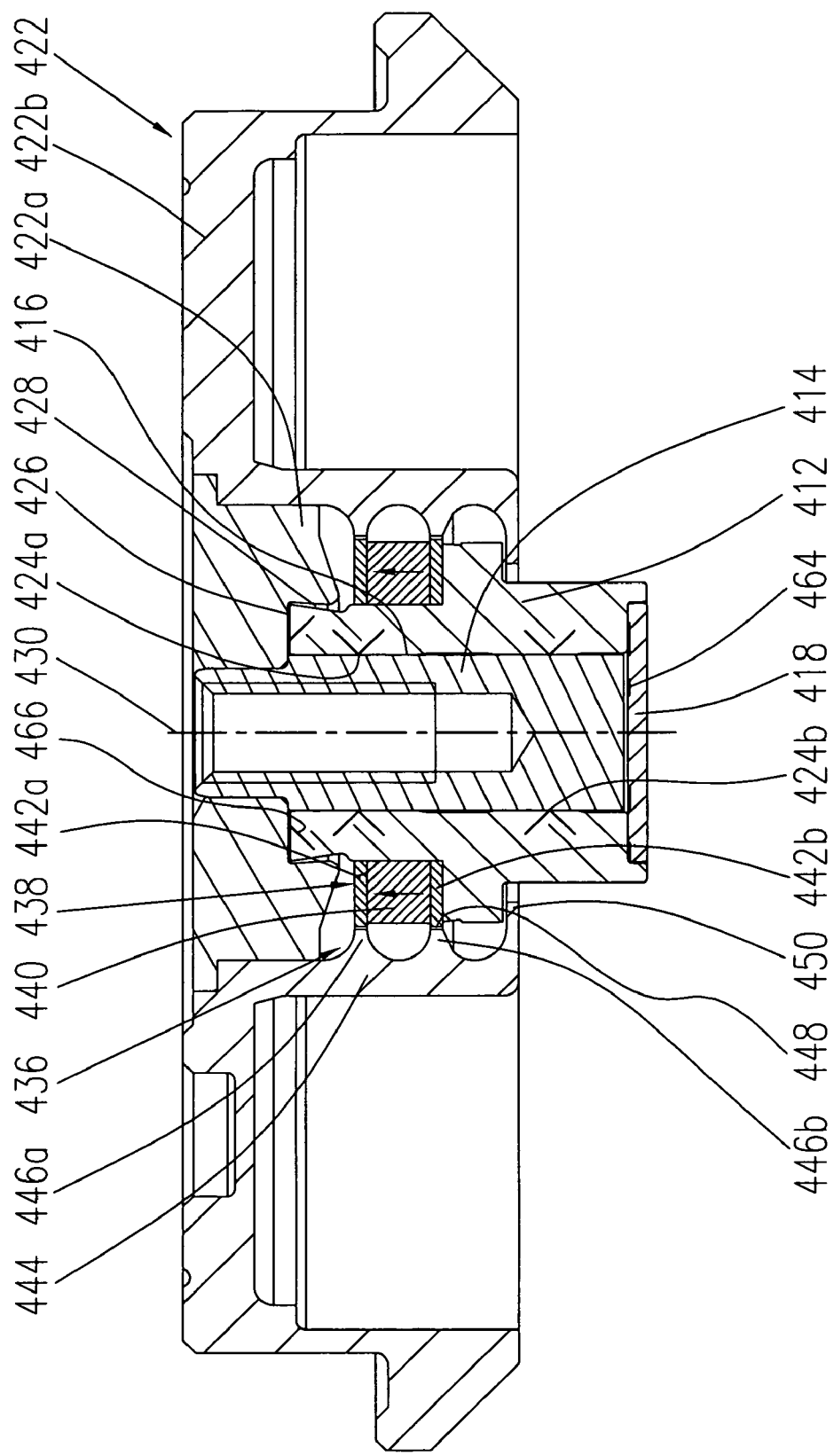
FIG. 14 shows a section through a third embodiment of a spindle motor according to the invention having a magnetic axial bearing, the baseplate and drive components not being illustrated.

FIG. 14 shows a spindle motor that is constructed in a similar manner to the spindle motor of FIG. 12 and FIG. 13. The baseplate and the electromagnetic drive system illustrated in FIG. 12 are again missing.

The spindle motor comprises a bearing bush 412 in which a shaft 414 is rotatably supported about a rotational axis 430 by means of two radial bearings, preferably fluid dynamic radial bearings 424a and 424b. The shaft 414 is substantially cylindrical in shape throughout and does not have a stopper ring. One end of the bearing is closed by a cover plate 418. The surfaces of the shaft 414 and the bearing bush 412 are separated from each other by a bearing gap 416, the bearing gap 416 merging into a sealing gap 428 that is connected via a connecting gap 426 to the bearing gap 416. The arrangement of the bearing gap 416, connecting gap 426 and sealing gap 428 corresponds to the arrangement according to FIG. 12. A first bearing part 438 of the magnetic axial bearing 436 is disposed on a step at the outside circumference of the bearing bush 412, the first bearing part 438 comprising a permanent magnet 440 and flux guide elements 442a and 442b disposed on the end faces of the magnet. Opposite the first bearing part 438, there is a second bearing part 444 that forms part of an outer hub part 422b, which is connected to an inner hub part 422a, which in turn is connected to the shaft 414. The arrangement and function of the magnetic axial bearing 436 corresponds to that of the axial bearing from FIG. 12. The second bearing part 444 comprises two flux guide elements 446a and 446b that lie opposite the flux guide elements 442a and 442b of the first bearing part 438. Below the second flux guide element 446b, the second bearing part 444 continues and forms a radially inwards directed stopper ring 450 that lies opposite a step disposed on the bearing bush 412. Together with the step, the stopper ring 450 forms a stopper element that limits the axial play of the bearing system. Thus, in the case of this spindle motor, the stopper element is not formed by the shaft and the bearing bush, but rather by an extension on the second bearing part 444 in conjunction with a step on the bearing bush 412.

The stopper ring 450 provided on the second bearing part 444 has the further advantage that it is a dry-running stopper, i.e. a stopper that does not run in the bearing fluid and thus does not generate any friction losses during the regular operation of the bearing or the spindle motor. In contrast to this, a stopper ring running in bearing fluid, such as that illustrated in FIG. 12, continuously generates slight friction losses in the bearing fluid.

Figure 15:
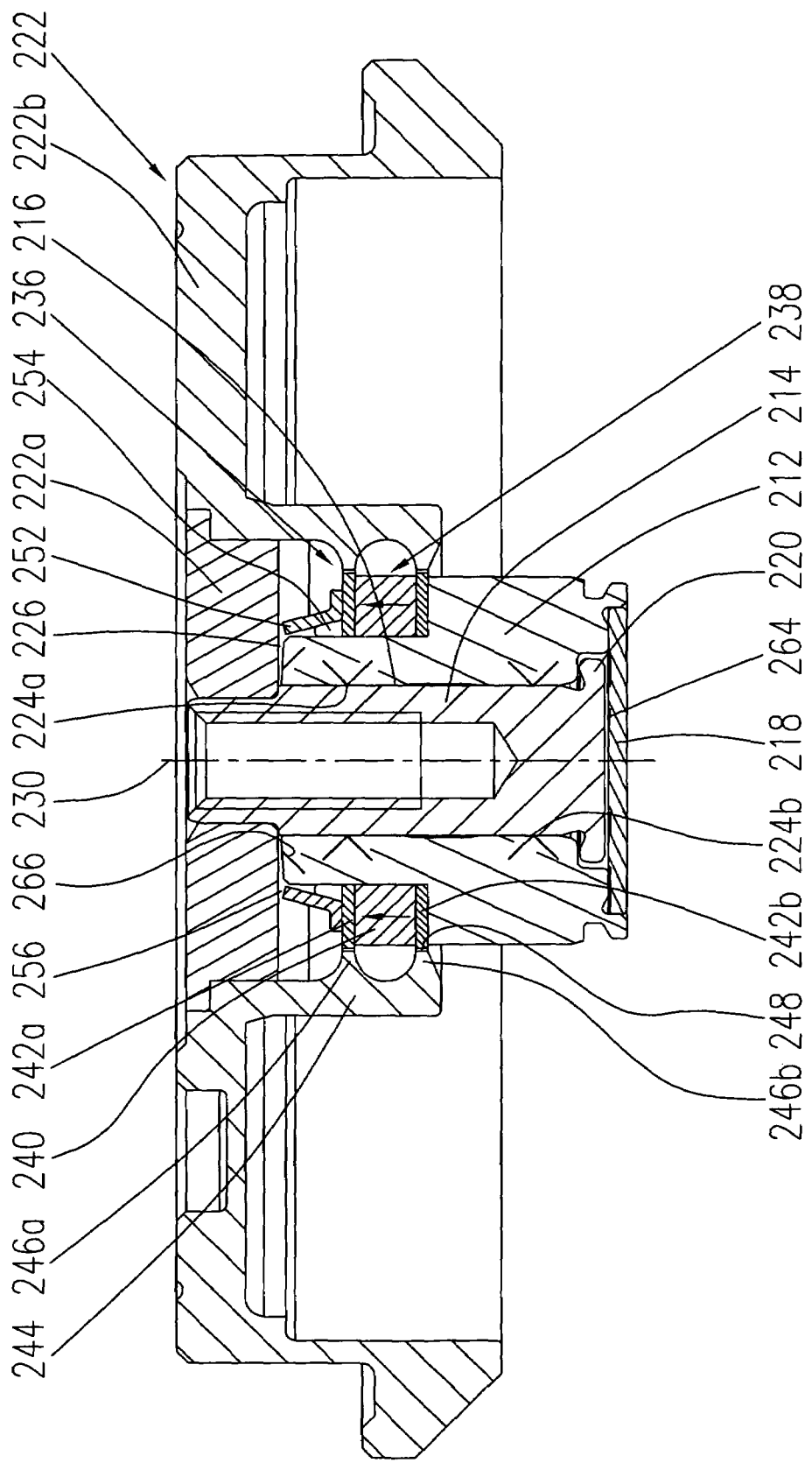
FIG. 15 shows a section through a fourth embodiment of a spindle motor according to the invention having a magnetic axial bearing, the baseplate and drive components not being illustrated.

FIG. 15 shows a further embodiment of a spindle motor according to the invention, similar to that of FIG. 12, identical components being given the same reference numbers. The baseplate and the electromagnetic drive system are not illustrated. The spindle motor in FIG. 15 differs essentially from the spindle motor of FIG. 12 in the sealing method for the bearing gap. The open end of the bearing gap 216 merges into a radial connecting gap 226 that is disposed annularly between an end face of the bearing bush 212 and an opposing annular surface of the hub 222 or of a hub part 222a. The connecting gap 226 may have a uniform width or its width may also widen radially outwards. Radially outside the connecting gap 226, a space is formed between a lower side of the hub part 222a and the two bearing parts 238 and 244 of the magnetic axial bearing. An annular component 252 is disposed in this space and fixed, for example, to the topside of the flux guide element 242a. An annular gap is formed between the inside circumference of the annular component 252 and the outside circumference of the adjoining bearing bush 212, the annular gap being tapered in cross-section and connected to the connecting gap 226. According to the invention, this annular gap is now used as a capillary sealing gap 254 and is partly filled with bearing fluid and thus particularly acts as an oil supply volume for any bearing fluid expanding in volume due to rises in temperature. The connecting gap 226 is fully filled with bearing fluid. A further gap 256 is provided for sealing the bearing gap 216 or the entire bearing, this gap remaining between the upper edge of the annular component 252 and the underside of the hub component 222a. This gap 256 again forms a capillary seal and is thus small enough to prevent any leakage of bearing fluid through the capillary effect. For example, the gap 256 is approximately 7-10 μm wide, whereas the sealing gap 254 at its narrowest point can be 40-100 μm wide. The advantage of this construction is that the oil supply volume is essentially formed between the bearing bush 212 and the annular component 252 and thus between two non-rotating bearing parts and therefore only small centrifugal effects and friction losses occur.

Figure 16:
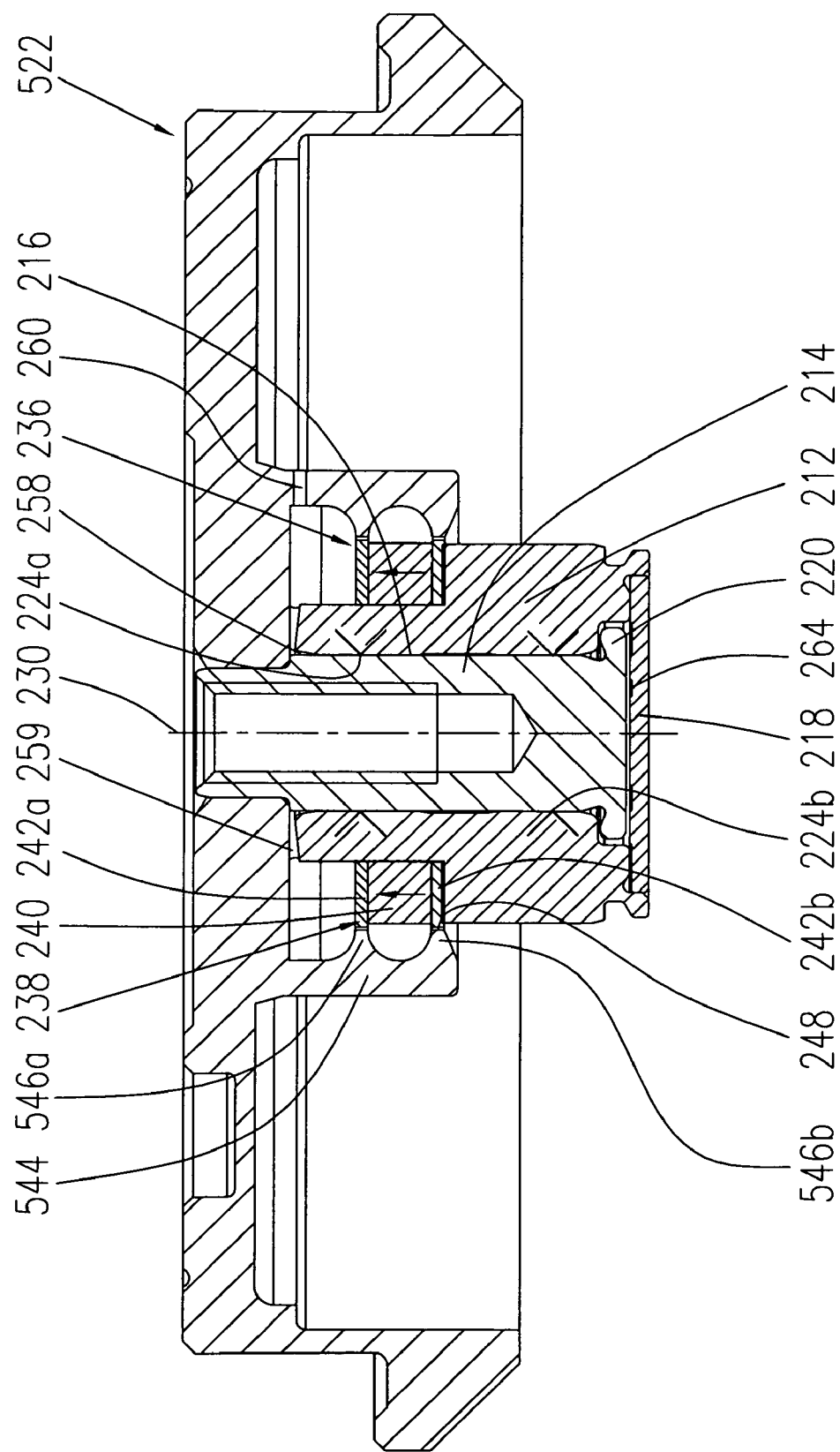
FIG. 16 shows a section through a fifth embodiment of a spindle motor according to the invention having a magnetic axial bearing, the baseplate and drive components not being illustrated.

FIG. 16 shows a spindle motor that is constructed in a similar manner to the spindle motors of FIG. 12 and FIG. 15. Identical components are indicated by the same reference numbers. The description of the motor according to FIG. 12 applies here. In the spindle motor of FIG. 16, a sealing gap 258 is formed in extension of the bearing gap 216 by a tapered widening of the bearing bush 212 at its open end. The sealing gap 258 widens to a taper and forms a tapered capillary seal. The axially extending sealing gap 258 merges into a radially extending gap 259 that is partly filled with bearing fluid and represents an extension of the sealing gap 258. The gap 259 acts as a reservoir for bearing fluid, as do the sealing gaps according to the other embodiments. The gap 259 opens radially outwards and is thus susceptible to centrifugal forces that act on the bearing fluid, so that at high rotational speeds, bearing fluid can escape from the gap 259 towards the outside. Thus the motor according to FIG. 16 is primarily suited for lower rotational speeds. The axial magnetic bearing system 236 is formed by a first bearing part 238 that is disposed on a step in the bearing bush 12. The hub 322 is integrally formed as one piece and comprises an annular extension piece, which forms the second bearing part 544 having the two flux guide elements 546a and 546b. Since the hub 322 and the second bearing part 544 are formed as one piece, the bearing is filled with bearing fluid after the hub 322 has been mounted on the shaft 214, preferably through a hole 260 that is made in a radial direction in the upper region of the second bearing part 544. Through this hole 260, bearing fluid can be introduced into the gap 259 and thus also into the bearing system.

For the spindle motors illustrated in FIGS. 12 to 15, the hub is either formed in two pieces or the second bearing part is formed as a separate component to the hub making it possible to fill the bearing without any further requirements.

Figure 17:
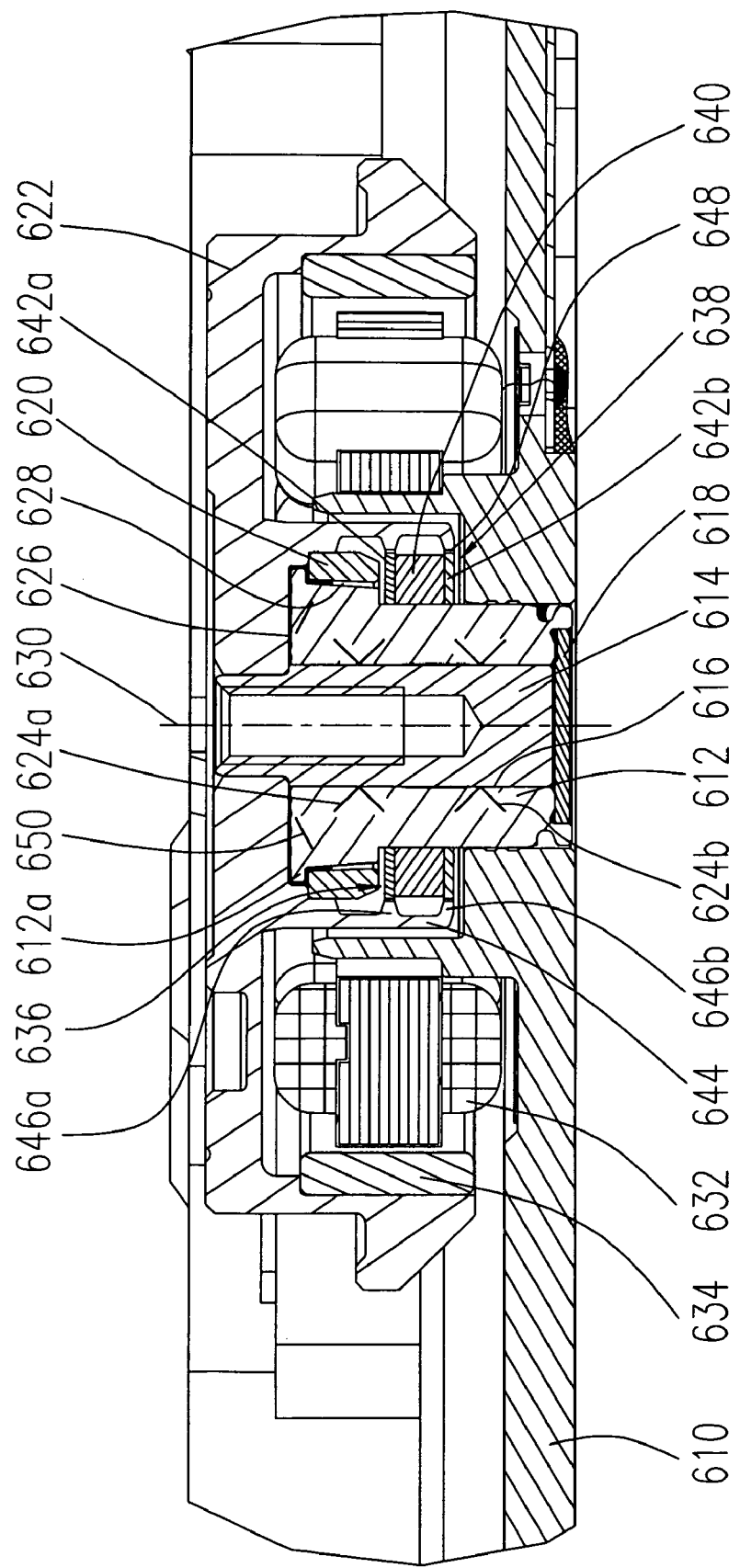
FIG. 17 shows a section through a sixth embodiment of a spindle motor according to the invention having a magnetic axial bearing.

FIG. 17 shows a section through a further spindle motor designed according to the invention. The spindle motor comprises a baseplate 610 that has an opening in which a bearing bush 612 is fixed. The bearing bush 612 has a central bearing bore in which a shaft 614 is rotatably supported. A bearing gap 616 of several micrometers in width that is filled with a bearing fluid remains between the outside circumference of the shaft 614 and the inside circumference of the bore in the bearing bush 612. To prevent bearing fluid from leaking from the bearing gap 616, the bearing gap is closed at one end by a cover plate 618 that is disposed and fixed in a recess in the bearing bush 612. Spiral-shaped, radially inward-pumping grooves for axial support or for expelling any air that may collect under the shaft 614 may be disposed on the cover plate 618 or on the opposing end face of the shaft 614. The gap distance between the shaft 614 and the cover plate 618 is relatively small and is, for example, 60 micrometers. The other end of the bearing gap 616 is connected via an annular connecting gap 626 to a sealing gap 628. The sealing gap 628 is formed as a tapered capillary seal that is approximately disposed in an axial direction between an outer sleeve surface of the bearing bush 612 and an opposing inner sleeve surface of an annular component 620 (stopper ring). The connecting gap 626 is approximately one order of magnitude wider than the bearing gap, for example, 640 micrometers. In the region of the connecting gap 626, additional pumping patterns 650 can be provided to compensate the centrifugal forces acting on the bearing fluid. These pumping patterns 650 are disposed on the end face of the bearing bush 612 or the opposing surface of a hub 622 and form a kind of pumping seal to reinforce the sealing effect of the sealing gap 628. The pumping patterns 650 generate a pumping effect in the interior of the bearing in the direction of the bearing gap 616.

The hub 622 is connected to the free end of the shaft 614. The shaft 614 is supported in the bearing bush 612 by two fluid dynamic radial bearings 624a and 624b, which are marked by herringbone bearing patterns on the bearing surfaces. In principle, the radial bearings may also be formed as multi-face slide bearings or grooveless slide bearings. To prevent any excessive axial movement of the shaft 614 in the bearing bush 612, a stopper ring 620 is disposed on a step of an extension piece of the hub 622. The stopper ring 620 defines the sealing gap 628 and lies axially opposite a collar 612a provided on the end face of the bearing bush 612. The stopper ring 620 strikes against this collar 612a as soon as the shaft 614 makes an excessive axial movement upwards. The stopper ring 620 is made of a non-magnetic or soft magnetic material.

The axial loads that act on the shaft 614 are absorbed by a magnetic axial bearing 636, which is made up of a first bearing part 638 and a second bearing part 644. In FIG. 17, the first bearing part 638 is disposed radially inwards of the second bearing part 644 on a step at the outside circumference of the bearing bush 612. The first bearing part 638 comprises an annular permanent magnet 640 disposed concentric to the rotational axis 630 made, for example, of NdFeB or SmFeN. Two annular flux guide elements 642a, 642b are disposed on the end faces of the permanent magnet 640, the annular flux guide elements 642a, 642b being preferably made of a radial anisotropic ferromagnetic plate having a thickness, for example, of 0.2 mm or from a stack of laminations. The permanent magnet 640 is magnetized unipolarly or multipolarly in an axial direction, i.e. in the direction of the rotational axis 630. To prevent the bearing bush 612 as far as possible from short circuiting the magnetic flux, it is preferably made, and perhaps the shaft 614 as well, of a non-magnetic material or of soft magnetic steel having magnetic permeability of less than 100.

In this embodiment, the second bearing part 644 comprises an annular extension piece formed on the hub 622, the extension piece forming two defined, preferably integral flux guide elements 646a, 646b that are disposed opposite the flux guide elements 642a and 642b of the first bearing part 638 in a radial direction. The flux guide elements 642a and 642b preferably have a slightly larger outside diameter than the permanent magnet 640. The flux guide elements 646a and 646b of the second bearing part 644 similarly form a flux concentrator having annular zones and define the smallest inside diameter of the second bearing part 644. The opposing flux guide elements of the first and second bearing parts are separated from each other by an air gap 648. The magnetic flux lines emanating from the permanent magnet 640 of the first bearing part 638 are concentrated in the flux guide elements 642a and 642b and led in a radial direction via the air gap 648 and the flux guide elements 646a and 646b of the second bearing part 644 back to the permanent magnet 640. As soon as the shaft 614 and the hub 622 are deflected in an axial direction with respect to the bearing bush 612 and the baseplate 610, the interaction of the permanent magnet 640 with the flux guide elements 642a, 642b and the flux guide elements 646a and 646b of the opposing bearing part generates a restoring force in an axial direction (direction of the rotational axis 630), which keeps the rotatable motor component in stable levitation in an axial direction with respect to the stationary motor component. The hub 622, on which the second bearing part 644 is molded, is preferably made of a ferromagnetic material, such as steel.

The electromagnetic drive system of the spindle motor is formed by a stator arrangement 632 fixed to the baseplate 610, a rotor magnet 634 disposed radially outwards on the hub 622 lying opposite the stator arrangement 632. Since the hub is magnetic, a separate back yoke ring for the rotor magnet can be dispensed with.

During assembly of the spindle motor, the shaft 614 is first pressed or bonded into the opening in the hub 622 and set at a right angle to the hub 622. Then the lower opening in the bearing bush 612 is sealed with the cover plate 618. The cover plate 618 is, for example, welded or bonded to the bearing bush 612. The bearing bush 612 sealed at one end is then placed on the shaft 614. The stopper ring 620 is then fixed on the hub 622, so that the shaft 614 can no longer slip out of the bearing bush 612. Using a suitable method also known in the prior art, bearing fluid is now filled via the sealing gap 628 into the bearing, i.e. the bearing gap 616 and the connecting gap 626. The gap distance of the connecting gap 626 is subsequently adjusted using an appropriate adjusting device and the axial bearing 636 is mounted. The first bearing part 638 of the axial bearing 626 is attached to the bearing bush 612 and fixed with adhesive. The adhesive acts as a lubricant, so that, due to axial magnetic forces, the first bearing part 638 can align itself axially with respect to the second bearing part 644 before the adhesive sets.

Figure 18:
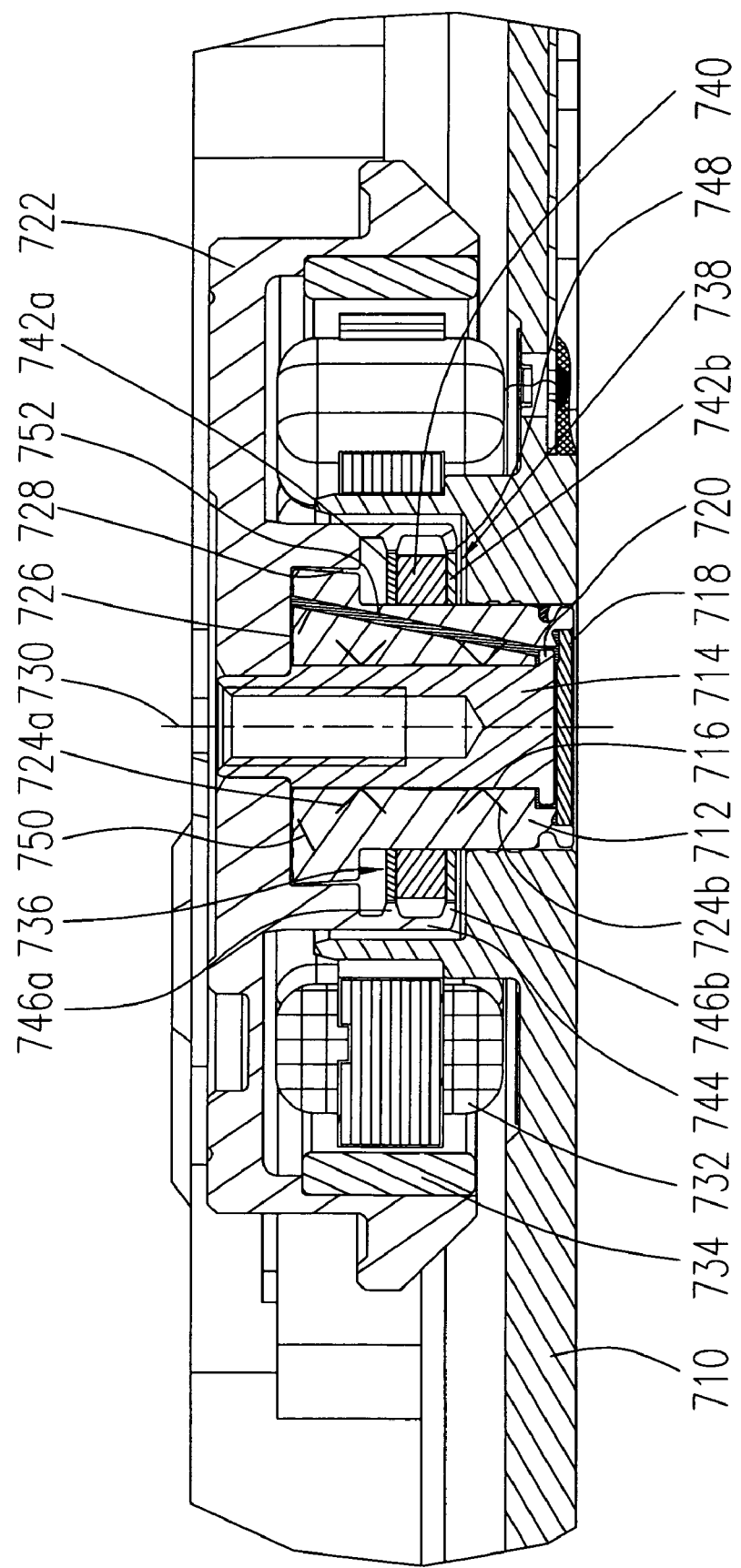
FIG. 18 shows a section through a seventh embodiment of a spindle motor according to the invention having a magnetic axial bearing.

FIG. 18 shows a second embodiment of a spindle motor according to the invention. In FIG. 18, identical components are indicated by corresponding reference numbers as in FIG. 17, whereby the corresponding reference numbers are indicated by numbers in the seven hundreds rather than in the six hundreds. In contrast to FIG. 17, the shaft 714 has a stopper ring 720 at its end adjacent to the cover plate 718, the stopper ring 720 being disposed in a recess in the bearing bush 712. The stopper ring 720 lies opposite a step formed by the bearing bush 712 and strikes against this step as soon as the shaft 714 makes an excessive axial movement.

The bearing gap 716 is connected via the connecting gap 726 to the sealing gap 728. The sealing gap 728 is defined by an outer sleeve surface of the bearing bush 712 and an inner sleeve surface of an annular extension piece of the hub 722. The second bearing part 744 of the axial bearing is likewise disposed on the annular extension piece of the hub 722.

A recirculation channel 752 is optionally provided in the bearing bush 712, the recirculation channel 752 being formed as a bore in the bearing bush 712 running at an angle to the rotational axis 730. This recirculation channel 752 connects the lower region of the bearing, i.e. the section of the bearing gap 716 in the region of the stopper ring 720 to the connecting gap 726 and ensures uniform circulation of the bearing fluid in the bearing gap 716 as well as pressure equalization—particularly at the end of the shaft—within the fluid bearing.

For all the spindle motors illustrated in the drawings, the first bearing part of the axial bearing may alternatively be disposed on the hub and the second bearing part on the bearing bush accordingly.

IDENTIFICATION REFERENCE LIST

10 Stator component, baseplate
12 Bearing bush
14 Shaft
15 Stopper ring
16 Rotor component, hub
17 Cover plate
18a, 18b Radial bearing
20 Rotational axis
22 Axial bearing
24 First bearing part
26 Permanent magnet
28a, 28b Flux guide element
30 Second bearing part
32a, 32b Flux guide element
34 Air gap
36 Permanent magnet
38 Permanent magnet
40a, b, c Flux guide element
42a, b, c Flux guide element
44 Flux guide element
46 Flux guide element
48 Flux guide element
50 First bearing part
51 Permanent magnet
52 Second bearing part
54 Second bearing part
60 Characteristic
110 Stator component, baseplate
114 Shaft
116 Rotor component, hub
118a, 118b Radial bearing
120 Rotational axis
124 First bearing part
126 Permanent magnet
128a, 28b Flux guide element
130 Second bearing part
132a, 132b Flux guide element
156 Permanent magnet
210 Baseplate
212 Bearing bush
214 Shaft
216 Bearing gap
218 Cover plate
220 Stopper ring
222 Hub
222a, 222b Hub part
224a, 224b Radial bearing
226 Connecting gap
228 Sealing gap
230 Rotational axis
232 Stator arrangement
234 Rotor magnet
236 Axial bearing magnetic
238 First bearing part
240 Permanent magnet
241 Flux concentrator
242a, 242b Flux guide element
244 Second bearing part
246a, 246b Flux guide element
248 Air gap
252 Component, annular
254 Sealing gap
256 Gap
258 Sealing gap
259 Gap
260 Hole
264 Grooved patterns
266 Pumping patterns
322 Hub
344 Second bearing part
346a, 346b Flux guide element
412 Bearing bush 414 Shaft
416 Bearing gap
418 Cover plate
422 Hub
422a, 422b Hub part
424a, 424b Radial bearing
426 Connecting gap
428 Sealing gap
430 Rotational axis
436 Axial bearing magnetic
438 First bearing part
440 Permanent magnet
442a, 442b Flux guide element
444 Second bearing part
446a, 446b Flux guide element
448 Air gap
450 Stopper ring
464 Grooved patterns
466 Pumping patterns
522 Hub
544 Second bearing part
546a, 546b Flux guide element
610 Baseplate
612 Bearing bush
612a Collar
614 Shaft
616 Bearing gap
618 Cover plate
620 Stopper ring
622 Hub
624a, 624b Radial bearing
626 Connecting gap
628 Sealing gap
630 Rotational axis
632 Stator arrangement
634 Rotor magnet
636 Axial bearing magnetic
638 First bearing part
640 Permanent magnet
642a, 642b Flux guide element
644 Second bearing part
646a, 646b Flux guide element
648 Air gap
650 Pumping patterns
710 Baseplate
712 Bearing bush
714 Shaft
716 Bearing gap
718 Cover plate
720 Stopper ring
722 Hub
724a, 724b Radial bearing
726 Connecting gap
728 Sealing gap
730 Rotational axis
732 Stator arrangement
734 Rotor magnet
736 Axial bearing magnetic
738 First bearing part
740 Permanent magnet
742a, 742b Flux guide element
744 Second bearing part
746a, 746b Flux guide element
748 Air gap
750 Pumping patterns
752 Recirculation channel

The invention claimed is:

1. A bearing arrangement comprising:
a rotor component (16) including a shaft (14),
a stator component (10) including a bearing bush (12),
a fluid dynamic radial bearing (18a, 18b) for rotatably supporting the shaft (14) about a rotational axis (20; 120) with respect to the bearing bush (12),
a magnetic axial bearing (22) for taking up axial forces that act on the rotor component the magnetic axial bearing comprising:
a first bearing part (24; 50; 124) comprising at least one permanent magnet (26; 126) and at least two flux guide elements (28; 128) associated with the permanent magnet (26; 126) that are disposed on opposing end faces of the permanent magnet and aligned substantially radial and perpendicular to the rotational axis,
a second bearing part (30) comprising at least two flux guide elements (32; 132) that are disposed at a mutual spacing to one another and aligned substantially radial and perpendicular to the rotational axis,
each flux guide element (32; 132) of the second bearing part (30) being associated with a flux guide element (28; 128) of the first bearing part (22) and lying directly opposite the latter in a radial direction and separated from it by an air gap (34),
wherein the flux guide elements of one or both bearing parts narrow in cross section where they lie opposite of the respective flux guide element on the other bearing part in order to focus the magnetic flux that is generated by the permanent magnet.

2. A bearing arrangement according to claim 1, characterized in that one of the bearing parts (22; 30) is connected to the stator component and one of the bearing parts (30, 22) is connected to the rotor component.

3. A bearing arrangement according to claim 1, characterized in that the permanent magnet (26; 126) is annular and has first and second end faces as well as inner and outer circumferential surfaces.

4. A bearing arrangement according to claim 1, characterized in that the permanent magnet (26; 126) is axially magnetized in the direction of the rotational axis (20).

5. A bearing arrangement according to claim 1, characterized in that the permanent magnet (26; 126) is disposed concentric to the rotational axis (20).

6. A bearing arrangement according to claim 1, characterized in that an annular flux guide element (28a; 128a) is disposed on the first end face of the permanent magnet (26; 126), the annular flux guide element (28a; 128a) having inner and outer circumferential surfaces.

7. A bearing arrangement according to claim 1, characterized in that an annular flux guide element (28b; 128b) is disposed on the second end face of the permanent magnet (26; 126), the annular flux guide element (28b; 128b) having inner and outer circumferential surfaces.

8. A bearing arrangement according to claim 7, characterized in that the inner or outer circumferential surface of the flux guide elements (28; 128) protrude beyond the inner or outer circumferential surface of the permanent magnet (26; 126).

9. A bearing arrangement according to claim 1, characterized in that the second bearing part (30) is annular and lies opposite the permanent magnet (26; 126) of the first bearing part (22) in a radial direction.

10. A bearing arrangement according to claim 1, characterized in that the second bearing part (30) is made of a ferromagnetic material and is disposed concentric to the rotational axis.

11. A bearing arrangement according to claim 1, characterized in that the flux guide elements (32a, 32b) form an integral part of the second bearing part (30).

12. A bearing arrangement according to claim 1, characterized in that the second bearing part (30) has its largest outside diameter or smallest inside diameter in the region of the flux guide elements (32a, 32b).

13. A bearing arrangement according to claim 1, characterized in that the second bearing part (130) comprises a permanent magnet (156) that has first and second end faces as well as inner and outer circumferential surfaces.

14. A bearing arrangement according to claim 13, characterized in that the permanent magnet (156) is axially magnetized in the direction of the rotational axis (20).

15. A bearing arrangement according to claim 13, characterized in that the permanent magnet (156) is disposed concentric to the rotational axis (20).

16. A bearing arrangement according to claim 13, characterized in that an annular flux guide element (132a) is disposed on the first end face of the permanent magnet (156) and that the annular flux guide element (132a) has inner and outer circumferential surfaces.

17. A bearing arrangement according to claim 13, characterized in that an annular flux guide element (132b) is disposed on the second end face of the permanent magnet (156) and that the annular flux guide element (132b) has radially inner and radially outer circumferential surfaces.

18. A bearing arrangement according to claim 17, characterized in that the radially inner or radially outer circumferential surface of the flux guide elements (132) protrudes beyond the radially inner or radially outer circumferential surface of the permanent magnet (156).

19. A bearing arrangement according to claim 1, characterized in that the flux guide elements (28, 128; 32, 132) are made of a ferromagnetic material.

20. A bearing arrangement according to claim 1, characterized in that the flux guide elements (28, 128; 32, 132) are made up of a lamination stack whose metal sheets lie one on top of the other in an axial direction.

21. A bearing arrangement according to claim 1, characterized in that the permanent magnet comprises two or more annular permanent magnets (36; 38) that are oppositely magnetized in an axial direction.

22. A spindle motor that comprises:
a stationary motor component (210, 212; 412; 612; 712),
a rotatable motor component (214, 222; 322; 414; 422; 522; 614; 622; 714; 722),
at least one fluid dynamic radial bearing (224a, 224b; 424a, 424b; 624a, 624b; 724a, 724b) for the rotatable support of the rotatable motor component about a rotational axis (230; 430; 630; 730) with respect to the stationary motor component,
a bearing gap (216; 416; 616; 716) being formed between parts of the rotatable and parts of the stationary motor component and the bearing gap (216; 416; 616; 716) being filled with a bearing fluid, and
a magnetic axial bearing (236; 436; 636; 736) having
a first bearing part (238; 438; 638; 738) consisting of at least one permanent magnet (240; 440; 640; 740) and at least two flux guide elements (242a, 242b; 442a, 442b; 642a, 642b; 742a, 742b) associated with the permanent magnet (240; 440; 640; 740) that are disposed on opposing end faces of the permanent magnet and aligned substantially radial and perpendicular to the rotational axis,
a second bearing part (244; 344; 444; 544; 644; 744) having at least two flux guide elements (246a, 246b; 346a, 346b; 446a, 446b; 546a, 546b; 646a, 646b; 746a, 746b) that are disposed at a mutual axial spacing to one another and aligned substantially radial and perpendicular to the rotational axis,
each flux guide element of the second bearing part being associated with a flux guide element of the first bearing part and lying directly opposite the latter in a radial direction and separated from it by an air gap (248; 448; 648; 748),
wherein the flux guide elements of one or both bearing parts narrow in cross section where they lie opposite of the respective flux guide element on the other bearing part in order to focus the magnetic flux that is generated by the permanent magnet, and
an electromagnetic drive system having a stator arrangement (232; 632; 732) disposed on the stationary motor component and
a rotor magnet (234; 634; 734) disposed on the rotatable motor component.

23. A spindle motor according to claim 22, characterized in that the stationary motor component comprises a bearing bush (212; 412; 612; 712) fixed in a baseplate (210; 610; 710), and that the first bearing part of the magnetic axial bearing is disposed on an outside circumference of the bearing bush.

24. A spindle motor according to claim 22, characterized in that the rotatable motor component comprises a shaft rotatably supported in the bearing bush (214; 414; 614; 714) and a hub (222; 322; 422; 522; 622; 722) connected to the shaft, and that the second bearing part of the magnetic axial bearing is disposed on an inside circumference of the hub or a component connected to the hub and radially encloses the first bearing part of the magnetic axial bearing.

25. A spindle motor according to claim 22, characterized in that the permanent magnet of the first bearing part (38; 238) is annular and has first and second end faces as well as radially inner and radially outer circumferential surfaces.

26. A spindle motor according to claim 22, characterized in that the permanent magnet of the first bearing part is axially magnetized in the direction of the rotational axis.

27. A spindle motor according to claim 22, characterized in that the permanent magnet of the first bearing part is disposed concentric to the rotational axis.

28. A spindle motor according to claim 22, characterized in that the flux guide elements of the first bearing part are annular, are disposed on the end faces of the permanent magnet and have radially inner and radially outer circumferential surfaces.

29. A spindle motor according to claim 28, characterized in that the radially inner or radially outer circumferential surfaces of the flux guide elements of the first bearing part protrude beyond the radially inner or radially outer circumferential surface of the permanent magnet.

30. A spindle motor according to claim 22, characterized in that the flux guide elements of the first bearing part are made of a ferromagnetic material.

31. A spindle motor according to claim 22, characterized in that the second bearing part (130) comprises a permanent magnet (156) that has first and second end faces as well as radially inner and radially outer circumferential surfaces.

32. A spindle motor according to claim 31, characterized in that the permanent magnet of the second bearing part is axially magnetized in the direction of the rotational axis (20).

33. A spindle motor according to claim 31, characterized in that the permanent magnet of the second bearing part is disposed concentric to the rotational axis (20).

34. A spindle motor according to claim 31, characterized in that annular flux guide elements (132a, 132b) are disposed on the end faces of the permanent magnet of the second bearing part, the annular flux guide elements (132a, 132b) having radially inner and radially outer circumferential surfaces.

35. A spindle motor according to claim 34, characterized in that the radially inner or radially outer circumferential surfaces of the flux guide elements protrude beyond the radially inner or radially outer circumferential surface of the permanent magnet of the second bearing part.

36. A spindle motor according to claim 22, characterized in that the second bearing part of the magnetic axial bearing is annular and lies opposite the first bearing part in a radial direction.

37. A spindle motor according to claim 22, characterized in that the second bearing part of the magnetic axial bearing is made of a ferromagnetic material and is disposed concentric to the rotational axis.

38. A spindle motor according to claim 22, characterized in that the flux guide elements form an integral part of the second bearing part.

39. A spindle motor according to claim 22, characterized in that the second bearing part has its largest or smallest diameter in the region of the flux guide elements.

40. A spindle motor according to claim 22, characterized in that the flux guide elements of the second bearing part are made of a ferromagnetic material.

41. A spindle motor according to claim 22, characterized in that the flux guide elements of the first and/or second bearing part are made up of a lamination stack whose metal sheets lie one on top of the other in an axial direction.

42. A spindle motor according to claim 22, characterized in that the permanent magnet of the first bearing part comprises two or more annular permanent magnets that are oppositely magnetized in the direction of the rotational axis.

43. A spindle motor according to claim 31, characterized in that the permanent magnet of the second bearing part comprises two or more annular permanent magnets that are oppositely magnetized in an axial direction.

44. A spindle motor according to claim 24, characterized in that the hub (222; 422) is made up of a first hub part (222a; 422a) connected to the shaft (214; 414) and a second hub part (222b; 422b) connected to the first hub part.

45. A spindle motor according to claim 44, characterized in that the second bearing part (244; 444) is a part of the second hub part (22b; 422b) or forms the second hub part.

46. A spindle motor according to claim 22, characterized in that a sealing gap (228; 428; 628; 728) directly or indirectly adjoins the bearing gap, the sealing gap (228; 428; 628; 728) being disposed between a sleeve surface of the bearing bush and an opposing sleeve surface of the hub and being at least partly filled with bearing fluid.

47. A spindle motor according to claim 22, characterized in that a sealing gap (258; 259) directly or indirectly adjoins the bearing gap, the sealing gap (258; 259) being disposed between an end face of the bearing bush and an opposing annular surface of the hub and being at least partly filled with bearing fluid.

48. A spindle motor according to claim 22, characterized in that a sealing gap (254) directly or indirectly adjoins the bearing gap, the sealing gap (254) being disposed between a sleeve surface of the bearing bush and an opposing annular surface of a stationary annular component (252) and being at least partly filled with bearing fluid.

49. A spindle motor according to claim 22, characterized in that an annular connecting gap (626; 726) filled with bearing fluid adjoins the bearing gap (616; 716), the connecting gap (626; 726) being disposed between an end face of the bearing bush and an opposing surface of the hub, and that a substantially axially extending sealing gap (628; 728) adjoins the connecting gap, the sealing gap (628; 728) being disposed between a sleeve surface of the bearing bush and an opposing sleeve surface of a stopper ring and being at least partly filled with bearing fluid.

50. A spindle motor according to claim 22, characterized in that an annular transition gap (426) filled with bearing fluid adjoins the bearing gap (416), the transition gap (426) being disposed between an end face of the bearing bush (412) and an opposing surface of the hub (422), and that a substantially axially extending sealing gap adjoins the connecting gap, the sealing gap being disposed between a sleeve surface of the bearing bush and an opposing sleeve surface of the hub and being at least partly filled with bearing fluid.

51. A spindle motor according to claim 22, characterized in that a sealing gap (258; 259) directly or indirectly adjoins the bearing gap, the sealing gap (258; 259) being partly filled with bearing fluid and forming a capillary seal.

52. A spindle motor according to claim 51, characterized in that the sealing gap opens at an angle of 0 to 15° with respect to a rotational axis of the bearing.

53. A spindle motor according to claim 51, characterized in that the central axis of the sealing gap is aligned at an angle of 0 to 15°, preferably 3°-6° with respect to a rotational axis.

54. A spindle motor according to claim 24, characterized in that a stopper ring (220; 720) is disposed at one end of the shaft (214; 714), the stopper ring (220; 720) lying axially opposite a step disposed in the bore of the bearing bush.

55. A spindle motor according to claim 23, characterized in that a stopper ring (450) is disposed on the second bearing part (444), the stopper ring (450) lying axially opposite a step disposed at the outside circumference of the bearing bush (412).

56. A spindle motor according to claim 24, characterized in that a stopper ring (620) is disposed on the hub (622), the stopper ring (620) lying axially opposite a collar (612a) disposed at one end of the bearing bush.

57. A spindle motor according to claim 22, characterized in that an annular connecting gap (626) filled with bearing fluid adjoins the bearing gap (616), the connecting gap (626) being disposed between an end face of the bearing bush and an opposing surface of the hub, a grooved pattern of a pumping seal being disposed on at least one of the surfaces defining the connecting gap.

58. A bearing arrangement comprising:
a rotor component (16) including a shaft (14),
a stator component (10) including a bearing bush (12),
a fluid dynamic radial bearing (18a, 18b) for rotatably supporting the shaft (14) about a rotational axis (20; 120) with respect to the bearing bush (12),
a magnetic axial bearing (22) for taking up axial forces that act on the rotor component the magnetic axial bearing comprising
a first bearing part (24; 50; 124) comprising at least one permanent magnet (26; 126) and at least two flux guide elements (28; 128) associated with the permanent magnet (26; 126) that are disposed on opposing end faces of the permanent magnet and aligned substantially radial and perpendicular to the rotational axis,
a second bearing part (30) comprising at least two flux guide elements (32; 132) that are disposed at a mutual spacing to one another and aligned substantially radial and perpendicular to the rotational axis, each flux guide element (32; 132) of the second bearing part (30) being associated with a flux guide element (28; 128) of the first bearing part (22) and lying directly opposite the latter in a radial direction and separated from it by an air gap (34), wherein the flux guide elements of one or both bearing parts narrow in cross section where they lie opposite of the respective flux guide element on the other bearing part in order to focus the magnetic flux that is generated by the permanent magnet, and wherein the magnetic axial bearing is disposed at the same axial height as one of the fluid dynamic radial bearings.

* * * * *